United States Patent
Yamanaka et al.

(10) Patent No.: US 9,799,901 B2
(45) Date of Patent: Oct. 24, 2017

(54) CONTROL METHOD OF FLOW REGULATING VALVE OF OXIDIZING GAS AND FLOW REGULATION DEVICE

(71) Applicant: TOYOTA JIDOSHA KABUSHIKI KAISHA, Toyota-shi, Aichi-ken (JP)

(72) Inventors: Tomio Yamanaka, Nagoya (JP); Mitsuhiro Nada, Toyota (JP); Hiroyuki Suzuki, Ama (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/940,954

(22) Filed: Nov. 13, 2015

(65) Prior Publication Data

US 2016/0141684 A1    May 19, 2016

(30) Foreign Application Priority Data

Nov. 15, 2014  (JP) ................... 2014-232252

(51) Int. Cl.

| H01M 8/04 | (2016.01) |
|---|---|
| H01M 8/04746 | (2016.01) |
| H01M 8/04992 | (2016.01) |
| H01M 8/04089 | (2016.01) |
| H01M 8/04223 | (2016.01) |
| H01M 8/04537 | (2016.01) |
| H01M 8/043 | (2016.01) |
| G05D 7/06 | (2006.01) |
| H01M 8/04082 | (2016.01) |
| H01M 8/04955 | (2016.01) |

(52) U.S. Cl.
CPC ...... *H01M 8/04753* (2013.01); *G05D 7/0635* (2013.01); *H01M 8/043* (2016.02); *H01M 8/04089* (2013.01); *H01M 8/04231* (2013.01); *H01M 8/04552* (2013.01); *H01M 8/04559* (2013.01); *H01M 8/04992* (2013.01); *H01M 8/04201* (2013.01); *H01M 8/04955* (2013.01); *H01M 2250/20* (2013.01); *Y02T 90/32* (2013.01)

(58) Field of Classification Search
None
See application file for complete search history.

(56) References Cited

FOREIGN PATENT DOCUMENTS

JP    2006-269128    10/2006

*Primary Examiner* — Wyatt McConnell
(74) *Attorney, Agent, or Firm* — Finnegan, Henderson, Farabow, Garrett & Dunner, LLP

(57) ABSTRACT

There is provided a control method of a flow regulating valve of an oxidizing gas in a fuel cell. In a load disconnected state that the fuel cell is electrically disconnected from a load, the control method gradually opens the flow regulating valve that is configured to supply the oxidizing gas to a cathode of the fuel cell by a predetermined valve opening each time from a full-close position or gradually closes the flow regulating valve by a predetermined valve opening each time from a full-open position, so as to gradually change a supply amount of the oxidizing gas introduced to the cathode and cause hydrogen transmitted from an anode to the cathode in the fuel cell to be oxidized. The control method measures an open circuit voltage of the fuel cell accompanied with oxidation of the hydrogen and stores at least one valve-opening position among valve-opening positions of the flow regulating valve at a predetermined number of timings including a timing when the measured voltage shifts to an increase or shifts to a decrease, as a regulation reference valve-opening timing.

8 Claims, 6 Drawing Sheets

CONTROL METHOD OF FLOW REGULATING VALVE OF OXIDIZING GAS AND FLOW REGULATION DEVICE

CROSS-REFERENCE TO RELATED APPLICATIONS

The present application claims priority from Japanese patent application P2014-232252 filed on Nov. 15, 2014, the content of which is hereby incorporated by reference into this application.

BACKGROUND

Field

The present invention relates to a control method of a flow regulating valve of an oxidizing gas and a flow regulation device.

Related Art

In a fuel cell system including a fuel cell that generates electric power with supplies of a fuel gas and an oxidizing gas, various flow regulating valves are provided to adjust the valve-opening position of each conduit and thereby regulate the flow rate in a fuel gas supply system, as well as in an oxidizing gas supply system and an exhaust gas discharge system. A failure of the flow regulating valve affects the operation of the fuel cell. A proposed technique detects a failure of a flow regulating valve by taking advantage of the behavior of a voltage generated in a fuel cell that is related to the operation of the flow regulating valve (for example, JP 2006-269128A). This proposed technique obtains a behavior of voltage of the fuel cell in the normal valve-opening state of a purge valve, which is one type of the flow regulating valve, in an exhaust system and detects a failure of the purge valve when the actual behavior of voltage at the time of outputting a valve-opening instruction of the purge valve is different from the obtained behavior of voltage.

SUMMARY

The failure detection technique that utilizes the behavior of voltage of the fuel cell is applicable to flow regulating valves other than the purge valve. With progress of research for maintaining the performance of the fuel cell, there is a need for fine adjustment of a low flow rate in the flow regulating valve used to regulate the flow rate of the oxidizing gas.

At stop of power generation of the fuel cell, when hydrogen remains in an anode-side flow path of the fuel cell and oxygen remains in a cathode-side flow path of the fuel cell, the fuel cell has an extremely high open circuit voltage (OCV). The excessively high open circuit voltage of the fuel cell leads to an excessively high electrode potential at an electrode (cathode) of the fuel cell. Thus, elution (deterioration) of the catalyst accordingly proceeds at the electrode. This results in deteriorating the power generation performance and the durability of the fuel cell.

After stop of power generation of the fuel cell, the fuel gas is generally circulated at a low flow rate, so that hydrogen remains in the anode-side flow path. The remaining hydrogen is transmitted across an electrolyte membrane of the fuel cell to the cathode-side flow path, and reaction of oxidizing the transmitted hydrogen with the remaining oxygen proceeds at the cathode. As a result, some time after stop of power generation of the fuel cell, the open circuit voltage (cathode potential) is decreased by consumption of oxygen remaining in the cathode-side flow path. In this case, the cathode catalyst is reduced and is more likely to be eluted at the time of a subsequent increase of the cathode potential. At stop of power generation of the fuel cell, there is a need to adjust the flow rate of the oxidizing gas such as to keep the open circuit voltage of the fuel cell at a low voltage level. There is accordingly a need for a control method of the flow regulating valve that allows for fine adjustment of the flow rate of the oxidizing gas by taking advantage of the behavior of voltage of the fuel cell.

In order to solve at least part of the above problems, the invention may be implemented by any of the following aspects.

(1) According to one aspect of the invention, there is provided a control method of a flow regulating valve of an oxidizing gas. The control method of the flow regulating valve of the oxidizing gas controls the flow regulating valve that is configured to regulate a flow rate of the oxidizing gas supplied to a cathode of a fuel cell. The control method of the flow regulating valve of the oxidizing gas may comprise a first process of continuously performing either a gradual valve-opening operation that opens the flow regulating valve by a predetermined valve opening each time from a full-close position or a gradual valve-closing operation that closes the flow regulating valve by a predetermined valve opening each time from a full-open position in a load disconnected state that the fuel cell is electrically disconnected from a load which receives supply of electric power from the fuel cell, so as to gradually change a supply amount of the oxidizing gas that is introduced to the cathode and cause hydrogen transmitted from an anode across an electrolyte membrane to the cathode of the fuel cell to be oxidized with oxygen included in the introduced oxidizing gas; a second process of measuring an open circuit voltage of the fuel cell accompanied with oxidation of the hydrogen after each gradual valve-opening operation or each gradual valve-closing operation; and a third process of storing either at least one valve-opening position among valve-opening positions of the flow regulating valve by the gradual valve-opening operation in the first process at a predetermined number of timings including a timing when the measured voltage shifts to an increase during continuation of the gradual valve-opening operation or at least one valve-opening position among valve-opening positions of the flow regulating valve by the gradual valve-closing operation in the first process at predetermined number of timings including a timing when the measured voltage shifts to a decrease during continuation of the gradual valve-closing operation, as a regulation reference valve-opening position.

The control method of the flow regulating valve of the oxidizing gas according to the above aspect has the following advantages. The timing when the measured voltage shifts to an increase during continuation of the gradual valve-opening operation is a timing when the oxidizing gas is increased at the cathode during continuation of the gradual valve-opening operation after oxidation of entire hydrogen that is transmitted from the anode to the cathode across the electrolyte membrane prior to the gradual valve-opening operation (hereinafter referred to as transmitted hydrogen) with oxygen included in the remaining oxidizing gas at the cathode. In the state that the transmitted hydrogen is fully oxidized, oxygen included in the oxidizing gas is introduced to the cathode at the equivalent ratio of 1 to the transmitted hydrogen. The gradual valve-opening operation is performed in the load disconnected state. There is accordingly a small amount of the transmitted hydrogen, or in other words, a small amount of hydrogen remains at or is supplied to the anode, so that there is a low flow rate of the oxidizing gas containing oxygen that is introduced to the cathode at the equivalent ratio of 1 to the transmitted hydrogen. This low flow rate of the oxidizing gas is defined by at least one valve-opening position among valve-opening positions of the flow regulating valve by the gradual valve-opening operation at the timing when the measured voltage shifts to an increase during continuation of the gradual valve-opening operation and at a predetermined number of timings before and after the timing of this increasing voltage shift. This at least one valve-opening position is stored as the regulation reference valve-opening position. The valve-opening positions of the flow regulating valve by the gradual valve-opening operation at the predetermined number of timings are slightly different from the valve-opening position of the flow regulating valve at the timing when the measured voltage shifts to an increase during continuation of the gradual valve-opening operation, but these differences are relatively small. The valve-opening positions of the flow regulating valve by the gradual valve-opening operation at the timing of the increasing voltage shift and at the predetermined number of timings before and after this timing are regarded as substantially equivalent, and at least one of the valve-opening positions is stored as the regulation reference valve-opening position.

A timing when the measured voltage shifts to a decrease during continuation of the valve-closing operation is a timing when oxygen in the oxidizing gas introduced to the cathode prior to the gradual valve-closing operation is gradually consumed for oxidation of the transmitted hydrogen and decreases at the cathode to the equivalent ratio of to the transmitted hydrogen. The gradual valve-closing operation is also performed in the load disconnected state. There is accordingly a small amount of the transmitted hydrogen, or in other words, a small amount of hydrogen remains at or is supplied to the anode, so that there is a low flow rate of the oxidizing gas containing oxygen that remains at the cathode at the equivalent ratio of 1 to the transmitted hydrogen. This low flow rate of the oxidizing gas is defined by at least one valve-opening position among valve-opening positions of the flow regulating valve by the gradual valve-closing operation at the timing when the measured voltage shifts to a decrease during continuation of the gradual valve-closing operation and at a predetermined number of timings before and after the timing of this decreasing voltage shift. This at least one valve-opening position is stored as the regulation reference valve-opening position. The valve-opening positions of the flow regulating valve by the gradual valve-closing operation at the predetermined number of timings are slightly different from the valve-opening position of the flow regulating valve at the timing when the measured voltage shifts to a decrease during continuation of the gradual valve-closing operation, but these differences are relatively small. The valve-opening positions of the flow regulating valve by the gradual valve-closing operation at the timing of the decreasing voltage shift and at the predetermined number of timings before and after this timing are regarded as substantially equivalent, and at least one of the valve-opening positions is stored as the regulation reference valve-opening position. The control method of the flow regulating valve of the oxidizing gas according to the above aspect controls the flow regulating valve with setting the stored regulation reference valve-opening position as one target of regulation of the valve-opening position. This allows for fine adjustment of the flow rate of the oxidizing gas by taking advantage of the behavior of the measured voltage of the fuel cell.

(2) In the control method of the flow regulating valve of the oxidizing gas according to the above aspect, the first process may regulate either a valve-opening amount of the predetermined valve by each time of the gradual valve-opening operation or a valve-opening interval, such as to prevent the measured voltage from decreasing to a predetermined low voltage. This configuration has the following advantages. The gradual valve-opening operation prior to the timing when the measured voltage shifts to an increase during continuation of the valve-opening operation is performed while the measured voltage is still decreasing toward the shift point to an increase. Performing the gradual valve-opening operation without taking into account the valve-opening amount or the valve-opening interval is likely to decrease the open circuit voltage to a low voltage (for example, zero voltage) undesirable for the fuel cell. The control method of the flow regulating valve of the oxidizing gas according to this aspect suppresses the measured voltage that is the open circuit voltage from decreasing to the undesirable low voltage.

(3) In the control method of the flow regulating valve of the oxidizing gas according to the above aspect, the third process may control the flow regulating valve, such that the valve-opening position of the flow regulating valve stored as the regulation reference valve opening position is maintained over a predetermined time duration. This configuration suppresses elution and reduction of the cathode catalyst in the non-power generation state that the fuel cell is electrically disconnected from the load and improves the stability of the catalyst, thus allowing subsequent power generating operation of the fuel cell to be performed without difficulty.

(4) The control method of the flow regulating valve of the oxidizing gas according to the above aspect may further comprise a fourth process of updating and storing the regulation reference valve-opening position stored in the third process. The third process may store an open circuit voltage of the fuel cell accompanied with oxidation of the hydrogen at the stored regulation reference valve-opening position as a comparison reference open circuit voltage, together with the regulation reference valve-opening position. The fourth process may comprise a comparison process of setting a valve-opening position of the flow regulating valve to the regulation reference valve-opening position stored in the third process in the load disconnected state of the fuel cell, measuring an open circuit voltage of the fuel cell accompanied with oxidation of the hydrogen as a comparative open circuit voltage, and comparing the comparative open circuit voltage with the comparison reference open circuit voltage; and a correction process of correcting the stored regulation reference valve-opening position to decrease a difference voltage between the comparative open circuit voltage and the comparison reference open circuit voltage obtained as a result of the comparison in the comparison process, and updating and storing the corrected regulation reference valve-opening position as a new regulation reference valve-opening position. Even when the opening and closing functions of the flow regulating valve is varied with time or is otherwise varied, the regulation reference valve-opening position is newly stored to compensate for the variation of the opening and closing functions. This configuration controls the flow regulating valve with setting the new regulation reference valve-opening position as one target of regulation of the valve-opening position. This accordingly allows for continuous fine adjustment of the flow rate of the oxidizing gas by taking advantage of the behavior of the measured voltage of the fuel cell.

(5) According to another aspect of the invention, there is provided a flow regulation device. The flow regulation device comprises a flow regulating valve that is configured to regulate a flow rate of an oxidizing gas supplied to a cathode of a fuel cell; a disconnector that is configured to electrically disconnect the fuel cell from a load which receives supply of electric power from the fuel cell and thereby set the fuel cell in a load disconnected state; a voltage meter that is configured to measure an open circuit voltage of the fuel cell; and a valve controller that controls opening and closing of the flow regulating valve in the load disconnected state. The valve controller comprises a first controller that is configured to continuously perform either a gradual valve-opening operation that opens the flow regulating valve by a predetermined valve opening each time from a full-close position or a gradual valve-closing operation that closes the flow regulating valve by a predetermined valve opening each time from a full-open position, so as to gradually change a supply amount of the oxidizing gas that is introduced to the cathode and cause hydrogen transmitted from an anode across an electrolyte membrane to the cathode of the fuel cell to be oxidized with oxygen included in the introduced oxidizing gas; a second controller that is configured to obtain the measured open circuit voltage of the fuel cell accompanied with oxidation of the hydrogen from the voltage meter after each gradual valve-opening operation or each gradual valve-closing operation; and a third controller that is configured to store either at least one valve-opening position among valve-opening positions of the flow regulating valve by the gradual valve-opening operation performed by the first controller at a predetermined number of timings including a timing when the measured voltage shifts to an increase during continuation of the gradual valve-opening operation or at least one valve-opening position among valve-opening positions of the flow regulating valve by the gradual valve-closing operation performed by the first controller at predetermined number of timings including a timing when the measured voltage shifts to a decrease during continuation of the gradual valve-closing operation, as a regulation reference valve-opening position.

The flow regulation device of the above aspect controls the flow regulating valve with setting the stored regulation reference valve-opening position as one target of regulation of the valve-opening position. This allows for fine adjustment of the flow rate of the oxidizing gas by taking advantage of the behavior of the measured voltage of the fuel cell.

The invention may be implemented by any of various aspects other than the control method of the flow regulating valve of the oxidizing gas and the flow regulation device of the above aspects, for example, an oxidizing gas supply device that is configured to supply an oxidizing gas to a cathode of a fuel cell, a fuel cell system including the oxidizing gas supply device as well as a fuel cell and a method of supplying an oxidizing gas to a fuel cell.

DESCRIPTION OF THE EMBODIMENTS

A. General Configuration of Fuel Cell System

Figure 1:
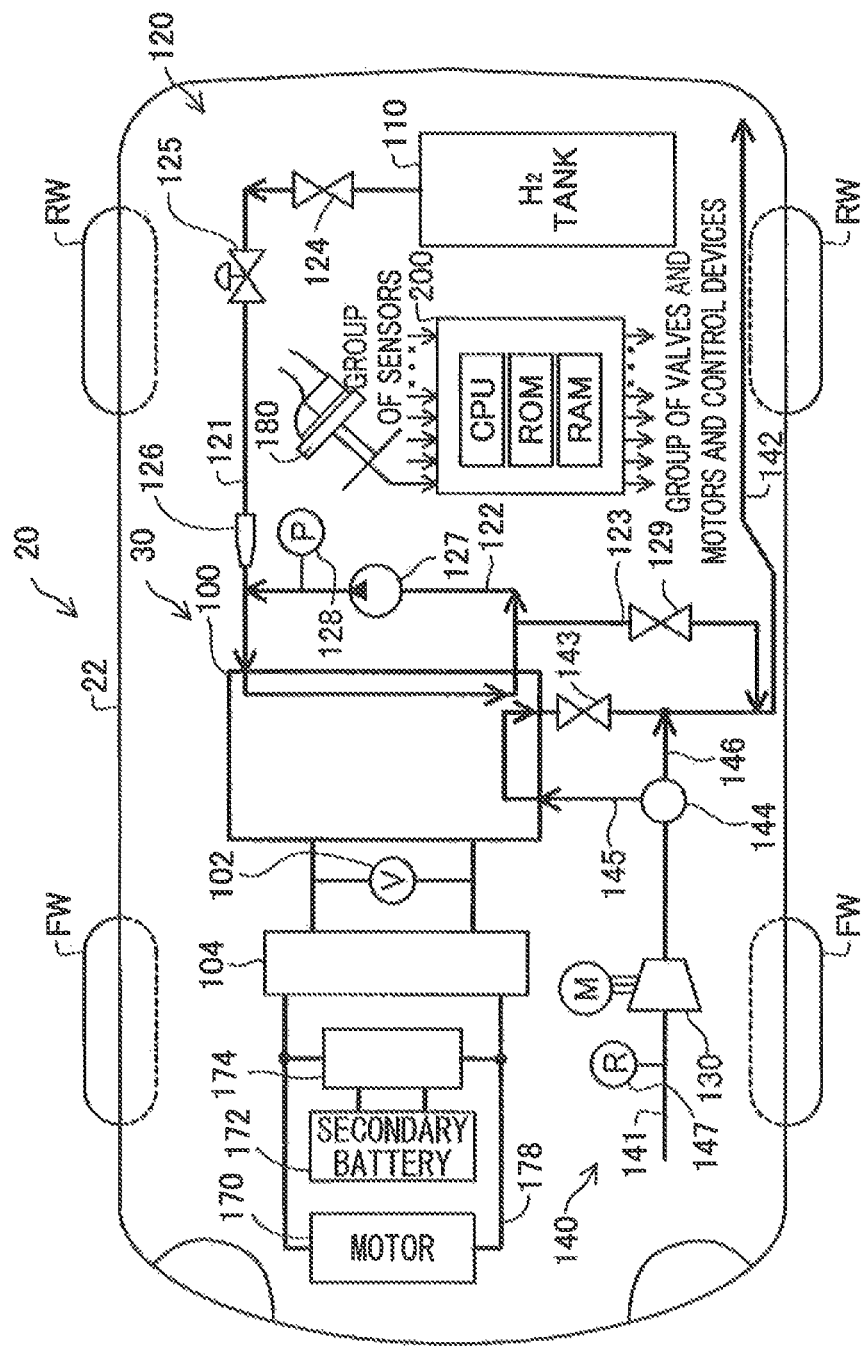
FIG. 1 is a block diagram illustrating the schematic configuration of a fuel cell vehicle according to one embodiment of the invention.

FIG. 1 is a block diagram illustrating the schematic configuration of a fuel cell vehicle 20 according to one embodiment of the invention. The fuel cell vehicle 20 has a fuel cell system 30 mounted on a vehicle body 22. The fuel cell system 30 is connected with a motor 170 for driving the fuel cell vehicle 20 by a wiring 178, such that electric power generated by the fuel cell system 30 is supplied to the motor 10 via the wiring 178.

The fuel cell system 30 includes a fuel cell 100, a hydrogen gas supply system 120 including a hydrogen tank 110, an air supply system 140 including a compressor 130, a secondary battery 172, a DC/DC converter 104, a DC/DC converter 174 and a controller 200. The fuel cell system 30 further includes a cooling medium circulation system (not shown) that is configured to make a flow of and circulate a cooling medium in the fuel cell 100 for cooling down the fuel cell 100, in order to keep the temperature of the fuel cell 100 in a predetermined range. The fuel cell system 30 is configured such that electric power is suppliable to a load including the motor 170 from either one of the fuel cell 100 and the secondary battery 172 alone or from both the fuel cell 100 and the secondary battery 172 simultaneously.

The fuel cell 100 has stacked structure by stacking a plurality of unit cells. The fuel cell 100 of this embodiment is a polymer electrolyte fuel cell. An anode-side flow path configured to make a flow of hydrogen to an anode side and a cathode-side flow path configured to make a flow of oxygen to a cathode side are formed across an electrolyte membrane in each of the unit cells constituting the fuel cell 100. The fuel cell 100 is connected with the load including the motor 170 via the DC/DC converter 104 and the wiring 178. A voltage sensor 102 is provided to detect the voltage of the fuel cell 100. The detection signal of the voltage sensor 102 is output to the controller 200.

The DC/DC converter 104 serves to change the output condition of the fuel cell 100 in response to a control signal from the controller 200. More specifically, the DC/DC converter 104 serves to set an output voltage in the course of power generation by the fuel cell 100. The DC/DC converter 104 also serves to boost up the output voltage to a desired voltage in the course of supplying electric power generated by the fuel cell 100 to the load. The DC/DC converter 104 includes a diode (not shown). Providing the diode in the DC/DC converter 104 electrically disconnects the fuel cell 100 from the load when the output current of the fuel cell 100 decreases to or below a predetermined level. According to this embodiment, the diode included in the DC/DC converter 104 works to provide a load disconnected state in which the fuel cell 100 is electrically disconnected from the load.

The hydrogen tank 110 included in the hydrogen gas supply system 120 may be, for example, a hydrogen tank that stores high-pressure hydrogen gas or a tank filled with a hydrogen storage alloy that serves to absorb hydrogen and thereby store hydrogen. The hydrogen gas supply system 120 includes a hydrogen supply path 121 that is arranged to connect the hydrogen tank 110 with the fuel cell 100, a circulation path 122 that is arranged to circulate unconsumed hydrogen gas (anode off-gas) to the hydrogen supply path 121, and a hydrogen release path 123 that is arranged to release the anode off-gas to the atmosphere. In the hydrogen gas supply system 120, hydrogen gas stored in the hydrogen tank 110 flows through the hydrogen supply path 121 that is opened and closed by an on-off valve 124, is subjected to pressure reduction by a pressure reducing valve 125 and is supplied from a hydrogen supply device 126 such as injector located downstream of the pressure reducing valve 125 to the anode-side flow path formed in each unit cell of the fuel cell 100. The flow rate of hydrogen circulated through the circulation path 122 is regulated by a circulation pump 127 provided in the circulation path 122. The controller 200 regulates the driving amounts of the hydrogen supply device 126 and the circulation pump 127 in response to a load request by referring to the pressure of the circulated flow of hydrogen detected by a pressure sensor 128.

Part of the hydrogen gas flowing through the circulation path 122 flows through the hydrogen release path 123 that is branched off from the circulation path 122 and is opened and closed by an on-off valve 129 and is released to the atmosphere at a predetermined timing. This causes impurities (for example, water vapor and nitrogen) other than hydrogen included in the hydrogen gas circulated through the circulation path 122 to be discharged out of the flow path and thereby suppresses an increase in concentration of the impurities included in the hydrogen gas supplied to the fuel cell 100. The controller 200 controls the open and close timings of the on-off valve 129.

The air supply system 140 includes a first air flow path 141, a second air flow path 145, a third air flow path 146, a distribution valve 144, an air release path 142, a back pressure valve 143 and a flow rate sensor 147, in addition to the compressor 130. The first air flow path 141 is configured to make a flow of the intake air taken in by the compressor 130. The second air flow path 145 and the third air flow path 146 are branched off from the first air flow path 141. The distribution valve 144 is placed at a branching position where the first air flow path 141 branches off to the second air flow path 145 and the third air flow path 146. The distribution ratio of the air flowing from the first air flow path 141 into the second air flow path 145 or the third air flow path 146 is regulated under control of the controller 200. Part of the second air flow path 145 forms the cathode-side flow path formed in each of the unit cells of the fuel cell 100. The third air flow path 146 serves as a bypass flow path configured to introduce the air to the air release path 142 with bypassing the fuel cell 100. The second air flow path 145 and the third air flow path 146 branched at the position of the distribution valve 144 are both joined to the air release path 142. The back pressure valve 143 is a throttle valve that is provided in the second air flow path 145 to be located upstream of the connecting point with the third air flow path 146. The air release path 142 is configured to release the air passing through the third air flew path 146 along with the air or the cathode off-gas passing through the second air flow path 145 to the atmosphere. The hydrogen release path 123 described above is connected with the air release path 142, such that hydrogen flowing through the hydrogen release path 123 is diluted with the air flowing through the air release path 142, before being released to the atmosphere. The flow rate sensor 147 is provided in the first air flow path 141 to detect the total flow rate of the air taken in through the first air flow path 141.

The back pressure valve 143 includes a stepping motor (not shown). The valve-opening position of the back pressure valve 143 is adjustable to any desired position with high accuracy by controlling the number of steps of the stepping motor. Adjusting the valve-opening position of the back pressure valve 143 changes the back pressure in the cathode-side flow path of the fuel cell 100 and results in controlling the flow rate of the air flowing through the second air flow path 145 into the cathode-side flow path of the fuel cell 100. The back pressure valve 143 works as a flow regulation valve. The controller 200 regulates the driving amount of the compressor 130, the distribution ratio of the air by the distribution valve 144 and the valve-opening position of the back pressure valve 143.

The secondary battery 172 is connected with the wiring 178 via the DC/DC converter 174. The DC/DC converter 174 and the DC/DC converter 104 are connected in parallel by the wiring 178. For example, a lead acid battery, a nickel hydride battery or a lithium ion battery may be employed for the secondary battery 172. The secondary battery 172 is provided with a state-of-charge monitor (not shown) that is configured to detect the state of charge (SOC) or remaining capacity of the secondary battery 172. The state of charge detected by the state-of-charge monitor is output to the controller 200. The state-of-charge monitor may be configured as an SOC meter that integrates the current value and the time duration of charging and discharging of the secondary battery 172. Alternatively the state-of-charge monitor may be configured as a voltage sensor that detects the voltage of the secondary battery 172, in place of the SOC meter.

The DC/DC converter 174 has charge and discharge control functions to control charging and discharging of the secondary battery 172, and controls charging and discharging of the secondary battery 172 in response to a control signal from the controller 200. The DC/DC converter 174 sets a target voltage on the output side under control of the controller 200 and variably regulates the electric power charged into or discharged from the secondary battery 172 and the voltage level applied to the motor 170. When there is no need to charge or discharge the secondary battery 172, the DC/DC converter 174 disconnects the secondary battery 172 from the wiring 178.

The controller 200 is implemented by a microcomputer including a CPU that performs logical operations, a ROM and a RAM. The controller 200 inputs detection signals from various sensors, for example, an accelerator position sensor 180, a shift position sensor, a vehicle speed sensor and an ambient temperature sensor (not shown), in addition to the sensors included in the hydrogen gas supply system 120 and the air supply system 140 described above and performs various controls of the fuel cell vehicle 20 based on the input detection signals. For example, the controller 200 determines the magnitude of a load request based on, for example, the detection signal of the accelerator position sensor 180 and outputs drive signals to the relevant parts of the fuel cell system 30 to obtain an electric power corresponding to the load request from at least one of the fuel cell 100 and the secondary battery 172. More specifically in the case of obtaining electric power from the fuel cell 100, the controller 200 regulates the supply amounts of the respective gases from the hydrogen gas supply system 120 and the air supply system 140, in order to obtain a desired electric power from the fuel cell 100. The controller 200 also controls the DC/DC converters 104 and 174 to supply a desired mount of electric power to the motor 170. The controller 200 additionally includes a timer that is provided to measure a time elapsed since input of any of various signals or since execution of any of various processes.

B. Intermittent Operation Mode and Target Voltage

The fuel cell vehicle 20 of the embodiment changes the operation mode among a plurality of operation modes including an ordinary operation mode and an intermittent operation mode during operation of the fuel cell system 30. The ordinary operation mode is an operation mode that is selected when a load request to the fuel cell system 30 exceeds a predefined reference value and causes at least part of the load request including a required electric power of the motor 170 to be covered by electric power generated by the fuel cell 100. The intermittent operation mode is an operation mode that is selected when a load request to the fuel cell system 30 is equal to or lower than the predefined reference value and stops power generation of the fuel cell 100.

The load that receives the supply of electric power from the fuel cell system 30 includes vehicle auxiliary machinery and fuel cell auxiliary machinery, in addition to the motor 170 for driving the fuel cell vehicle 20. In the fuel cell system 30 of the embodiment, the load request includes a required electric power of the motor 170, a required electric power of the vehicle auxiliary machinery and a required electric power of the fuel cell auxiliary machinery. The vehicle auxiliary machinery includes, for example, air conditioning equipment, lighting devices, hazard lamps and direction indicators. The fuel cell auxiliary machinery includes, for example, the compressor 130, the circulation pump 127, various valves including the distribution valve 144 and the back pressure valve 143, a cooling medium pump configured to circulate the cooling medium and a radiator fan configured to cool down the cooling medium. In the case where the secondary battery 172 has a low state of charge (SOC), the secondary battery 172 may be part of the load. The fuel cell vehicle 20 of this embodiment determines a load request as the total of the required electric powers of the respective loads described above and selects the intermittent operation mode when the load request is equal to or lower than the predefined reference value. At the time of selection of the intermittent operation mode, the voltage of the fuel cell 100 during stop of power generation is controlled to a predetermined range.

Figure 2:
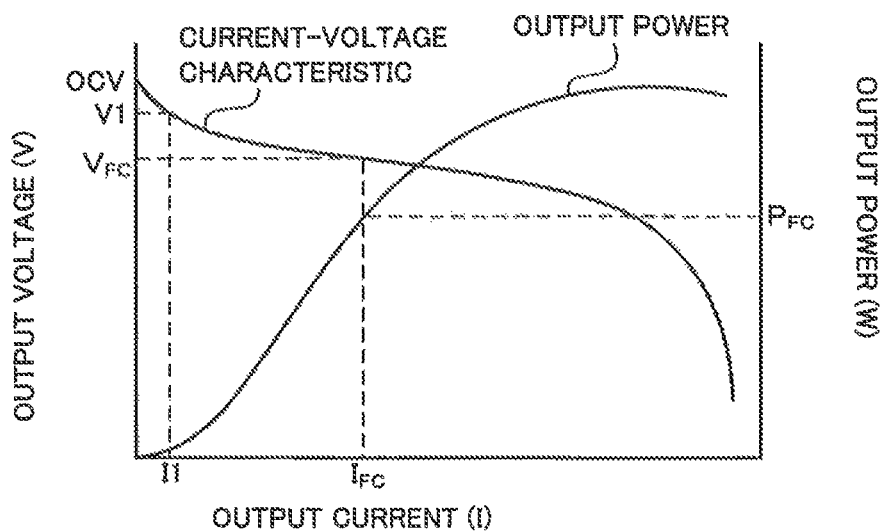
FIG. 2 is a diagram schematically illustrating a relationship between output current and output voltage and a relationship between output current and output power of a fuel cell.

FIG. 2 is a diagram schematically illustrating a relationship between output current and output voltage and a relationship between output current and output power of the fuel cell 100. The following briefly describes control at the time of selection of the ordinary operation mode and subsequently describes maintenance control in a non-power generation state.

According to this embodiment, the amount of electric power generated by the fuel cell 100 in the ordinary operation mode is controlled by setting the output voltage of the fuel cell 100. As understood from the relationship between the output current and the output power shown in FIG. 2, determining an electric power $P_{FC}$ to be output from the fuel cell 100 results in determining an output current $I_{FC}$ of the fuel cell 100. As shown by a current-voltage characteristic (I-V characteristic) in FIG. 2, determining the output current $I_{FC}$ of the fuel cell 100 results in determining an output voltage $V_{FC}$ of the fuel cell 100. At the time of selection of the ordinary operation mode, the controller 200 gives an instruction to set the determined output voltage $V_{FC}$ as a target voltage to the DC/DC converter 174, so as to control the amount of electric power generated by the fuel cell 100 to a desired level.

In the case where power generation of the fuel cell 100 is stopped at the time of selection of the intermittent operation mode, the output current of the fuel cell 100 is equal to 0. When power generation of the fuel cell 100 is stopped or more specifically when the fuel cell 100 is disconnected from the load to have the output current equal to 0 while sufficient amounts of hydrogen and oxygen for power generation are supplied to the fuel cell 100, the fuel cell 100 has an extremely high open-circuit voltage (hereinafter may be referred to as OCV) as shown in FIG. 2. This indicates a significant increase in electrode potential at the cathode of the fuel cell 100. As is known, the high electrode potential of the fuel cell 100 causes elution of a catalyst metal such as platinum included in the electrode and deteriorates the performance of the fuel cell 100. It is accordingly desirable to suppress an excessive increase in electrode potential of the fuel cell 100, in order to suppress deterioration of the performance of the fuel cell 100. The fuel cell system 30 of this embodiment regulates the amount of oxygen supplied to the cathode-side flow path during stop of power generation of the fuel cell 100 and thereby suppresses an excessive increase in electrode potential at the cathode.

Figure 3:
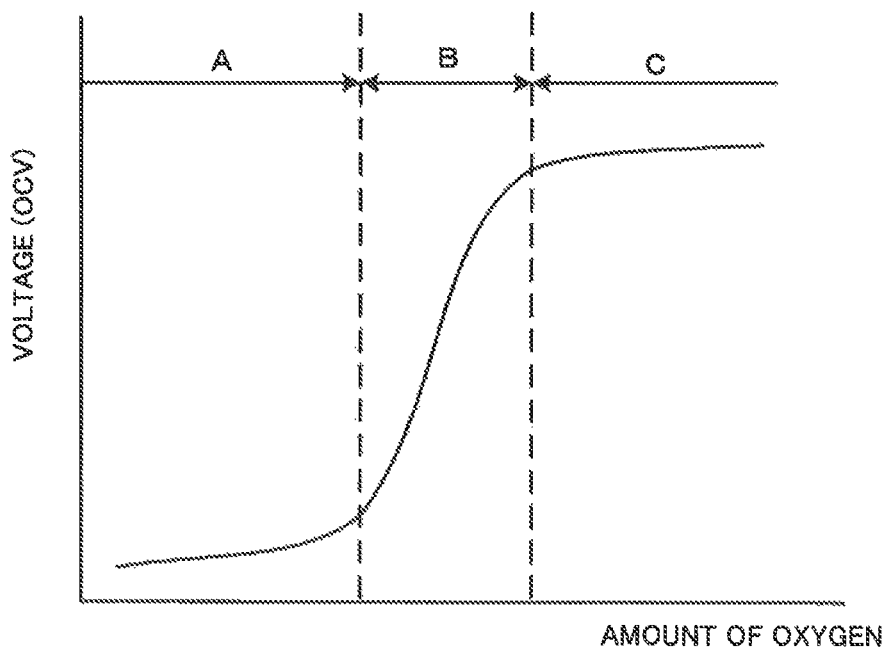
FIG. 3 is a diagram schematically illustrating a relationship between amount of oxygen supplied to a cathode-side flow path and OCV of the fuel cell.

FIG. 3 is a diagram schematically illustrating a relationship between amount of oxygen supplied to the cathode-side flow path and OCV of the fuel cell 100. The voltage profile of FIG. 3 schematically shows the relationship between the supply amount of oxygen and the open circuit voltage (OCV) of the fuel cell 100 when the amount of oxygen supplied to the cathode-side flow path is changed while a sufficient amount of hydrogen for power generation in the ordinary operation mode is supplied to the anode-side flow path during stop of power generation of the fuel cell 100. In the case where an extremely small amount of oxygen is supplied to the cathode-side flow path, the OCV is substantially kept at extremely low level and is not significantly changed with a change in supply amount of oxygen. In the diagram of FIG. 3, this range of the supply amount of oxygen is shown by an arrow A as an oxygen deficiency area A. When the supply amount of oxygen is increased, the OCV drastically increases with an increase in supply amount of oxygen. In the diagram of FIG. 3, this range of the supply amount of oxygen is shown by an arrow B as an equivalent ratio-of-approximately-1 area B. When the supply amount of oxygen is further increased, the OCV is substantially kept at extremely high level and is not significantly changed with a change in supply amount of oxygen. In the diagram of FIG. 3, this range of the supply amount of oxygen is shown by an arrow C as an excess oxygen area C. According to this embodiment, at the time of selection of the intermittent operation mode, the supply amount of oxygen is controlled, such that the OCV is equal to a specified voltage in the equivalent ratio-of-approximately-1 area B. In other words, according to this embodiment, at the time of selection of the intermittent operation mode, voltage including a specified voltage in the equivalent ratio-of-approximately-1 area B is set in advance as a target voltage Vmark of OCV, and the amount of oxygen supplied to the fuel cell 100 is regulated to make the OCV of the fuel cell 100 equal to the target voltage Vmark.

In the air supply system 140 of the embodiment, the amount of the air, i.e., the amount of oxygen, supplied to the cathode-side flow path of the fuel cell 100 is determined according to the driving amount of the compressor 130, the distribution ratio of the air by the distribution valve 144 and the valve-opening position of the back pressure valve 143 as described above. According to this embodiment, at the time of selection of the intermittent operation mode, the OCV of the fuel cell 100 is controlled to the target voltage Vmark by changing the valve-opening position of the back pressure valve 143 while fixing the driving amount of the compressor 130 and the distribution ratio of the air by the distribution valve 144 among these parameters. According to this embodiment, the target voltage Vmark and an initial value of the valve-opening position of the back pressure valve 143 (i.e., the driving amount of the back pressure valve 143) for supplying an amount of oxygen that obtains the target voltage Vmark to the fuel cell 100 are stored in advance in a memory of the controller 200. In the fuel cell system 30 of the embodiment, the valve-opening position of the back pressure valve 143 to obtain the target voltage Vmark is set or updated as appropriate by control in the intermittent operation mode described later.

After stop of power generation of the fuel cell 100, hydrogen is transmitted from the anode-side flow path to the cathode-side flow path across the electrolyte membrane in each unit cell, and the oxidation reaction of the transmitted hydrogen proceeds at the cathode. As a result, oxygen in the cathode-side flow path is consumed by the oxidation reaction of the hydrogen transmitted through the electrolyte membrane. In order to obtain a desired open-circuit voltage in the equivalent ratio-of-approximately-1 area in the fuel cell 100 during stop of power generation, there is a need to supply the amount of oxygen that is to be consumed by the oxidation reaction of the transmitted hydrogen (amount of oxygen consumed by transmitted hydrogen) in addition to the amount of oxygen determined corresponding to the desired open-circuit voltage from FIG. 3 (amount of oxygen required for electromotive force). Accordingly, the amount of oxygen that is to be supplied to the fuel cell 100 in order to obtain a desired open-circuit voltage at the time of selection of the intermittent operation mode (amount of oxygen for maintaining cell voltage) is expressed by Equation (1) given below:

(amount of oxygen for maintaining cell voltage)=
(amount of oxygen required for electromotive
force)+(amount of oxygen consumed by transmitted hydrogen)     (1)

When the amount of oxygen supplied to the fuel cell 100 just satisfies Equation (1) given above in the case where the valve-opening position of the back pressure valve 143 is adjusted to the valve-opening position stored in the memory of the controller 200, the open-circuit voltage of the fuel cell 100 becomes equal to the target voltage Vmark. The amount of hydrogen transmitted through the electrolyte membrane is, however, varied according to the pressure of hydrogen in the anode-side flow path, the internal temperature of the fuel cell 100 and the internal humidity of the fuel cell 100. When the supply amount of oxygen is insufficient due to these factors, the open-circuit voltage of the fuel cell 100 becomes lower than the target voltage Vmark. When the supply amount of oxygen is excessive, on the other hand, the open-circuit voltage of the fuel cell 100 becomes higher than the target voltage Vmark. The fuel cell system 30 of this embodiment performs control to vary the supply amount of oxygen to the fuel cell 100 based on the result of comparison between the detection value of the open-circuit voltage of the fuel cell 100 and the target voltage Vmark, so as to make the open-circuit voltage of the fuel cell 100 approach the target voltage Vmark. The details of this control will be described later.

With regard to the target voltage Vmark of OCV of the fuel cell 100 (average cell voltage according to this embodiment as described later) set at the time of selection of the intermittent operation mode, the voltage of each unit cell is preferably not higher than 0.9 V is more preferably not higher than 0.85V and is furthermore preferably not higher than 0.8 V, in terms of suppressing deterioration (elution) of the electrode catalyst caused by the high potential.

The lower cell voltage at the cathode or, in other words, the lower oxygen partial pressure in the cathode-side flow path, is expected to facilitate reduction of the electrode catalyst at the cathode (i.e., is more likely to eliminate the oxide film on the surface of the catalyst). Reducing the electrode catalyst at the cathode may cause a problem that elution of the electrode catalyst at the cathode is more likely to proceed with a subsequent increase in potential at the cathode by a subsequent supply of oxygen into the cathode-side flow path. Accordingly, at the time of selection of the intermittent operation mode, it is desirable that the cell voltage does not decrease to 0 V in any of the unit cells of the fuel cell 100. Accordingly, in terms of suppressing this problem caused by a decrease in cell voltage, the target voltage Vmark of OCV (average cell voltage) set at the time of selection of the intermittent operation mode is preferably not lower than 0.1 V and is more preferably not lower than 0.2 V.

At the time of selection of the intermittent operation mode, the load request is equal to or lower than the predefined reference value. The fuel cell system 30 is, however, in operation (with no input of the user's instruction to stop the system), so that the load request is likely to increase in a short time period. It is accordingly desirable not to excessively decrease the amount of oxygen in the cathode-side flow path, in terms of obtaining a desired electric power quickly in response to a subsequent increase in load request. In other words, in terms of ensuring the response to a subsequent increase in load request, it is desirable to set a higher value to the target voltage Vmark OCV (average cell voltage) at the time of selection of the intermittent operation mode. In order to ensure the response to a load request, for example, the target voltage Vmark of each cell is preferably not lower than 0.6 V and is more preferably not lower than 0.7 V.

Even at the time of selection of the intermittent operation mode, the anode-side flow path in the fuel cell 100 is maintained in the state that is in the presence of an amount of hydrogen which enables electric power exceeding the load request as the basis for selection of the intermittent operation mode to be generated immediately. In other words, even at the time of selection of the intermittent operation mode, the circulation pump 127 is continuously driven, while hydrogen is supplied from the hydrogen supply device 126 in order to compensate for the lost hydrogen that is transmitted across the electrolyte membrane to the cathode-side flow path.

At the time of selection of the intermittent operation mode, part of the hydrogen gas flowing through the circulation path 122 is released to outside of the fuel cell vehicle 20 by means of the on-off valve 129 provided in the hydrogen release path 123. This reduces the concentration of impurities (concentration of nitrogen and water vapor) included in the hydrogen gas flowing through the circulation path 122. At the time of selection of the intermittent operation mode, nitrogen in the air flows from the cathode-side flow path across the electrolyte membrane to the anode-side flow path. At the time of selection of the intermittent operation mode, hydrogen transmitted from the anode-side flow path to the cathode-side, flow path is oxidized at the cathode to produce water, and part of the produced water is transmitted in the form of water vapor to the anode-side flow path. Accordingly, upon determination that the concentration of impurities in the anode-side flow path exceeds a predetermined reference concentration, the controller 200 performs an operation of opening the on-off valve 129 for a predetermined time duration. The amounts of transmission of nitrogen and hydrogen depend on the time duration. The determination that the concentration of impurities in the anode-side flow path exceeds the reference concentration may thus be regarded as determination that an elapsed time since a previous operation of opening the on-off valve 129 exceeds a predetermined reference time. The operation of opening the on-off valve 129 may be performed at a timing based on this elapsed time. According to a modification, the concentration of impurities (concentration of nitrogen and/or concentration of water vapor) in the circulation path 122 may be measured directly, and the timing of the operation of opening the on-off valve 129 may be determined based on the measured concentration of impurities.

C. Control at Selection of Intermittent Operation Mode

Figure 4:
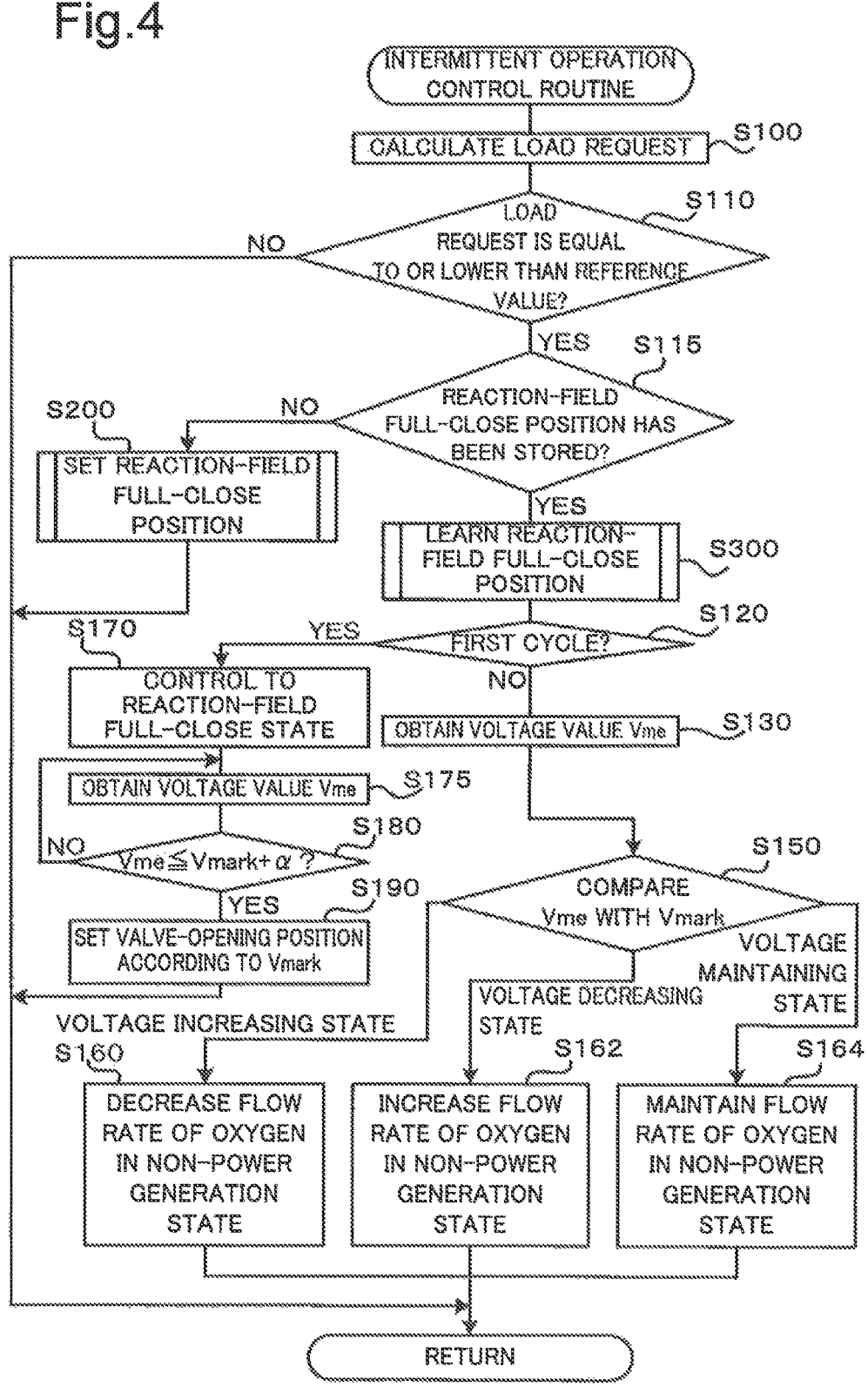
FIG. 4 is a flowchart showing an intermittent operation control routine performed by a controller as a series of operations at the time of selection of an intermittent operation mode.

FIG. 4 is a flowchart showing an intermittent operation control routine performed by the controller 200 as a series of operations at the time of selection of the intermittent operation mode. This routine is triggered after start of the fuel cell system 30 and is repeatedly performed during operation of the fuel cell system 30 until input of the user's instruction to stop the system. The interval at which this routine is repeatedly performed is set to a longer time duration (for example, 20 to 30 seconds) than the time duration required between a change in valve-opening position of the back pressure valve 143 in this routine and a resulting actual change in amount of oxygen supplied to the cathode-side flow path.

On start of this routine, the controller 200 calculates a load request (step S100). The load request denotes the total amount of the required electric power of the motor 170 and the required electric power of the vehicle auxiliary machinery and the fuel cell auxiliary machinery as described above. The required electric power of the motor 170 may be determined, based on the detection signals of the accelerator position sensor 180 and the vehicle speed sensor. The required electric power of the vehicle auxiliary machinery and the fuel cell auxiliary machinery may be determined, based on the driving signals output to the respective auxiliary machines.

The controller 200 subsequently determines whether the calculated load request is equal to or lower than a predefined reference value (step S110). When it is determined that the load request is higher than the predefined reference value, the fuel cell system 30 does not select the intermittent operation mode, so that the controller 200 immediately terminates this routine.

When it is determined at step S110 that the load request is equal to or lower than the predefined reference value, on the other hand, the controller 200 continues the series of processing in the intermittent operation mode. After it is determined at step S110 that the load request is equal to or lower than the predefined reference value, the intermittent operation control routine of FIG. 4 is repeatedly performed until it is determined at step S110 that the calculated load request becomes higher than the predefined reference value.

In this time duration, the operation mode of the fuel cell system 30 is maintained to the intermittent operation mode.

When it is determined at step S110 that the load request is equal to or lower than the predefined reference value, the controller 200 subsequently determines whether a reaction-field full-close position has been stored in a specified memory area (step S115). The reaction-field full-close position herein denotes a valve-opening position of the back pressure valve 143 that supplies an amount of oxygen at a boundary between the oxygen deficiency area A and the equivalent ratio-of-approximately-1 area B shown in FIG. 3. In other words, the reaction-field full-close position denotes a valve-opening position of the back pressure valve 143 that supplies an amount of oxygen which is required for oxidation of hydrogen transmitted through the electrolyte membrane (transmitted hydrogen) during stop of power generation of the fuel cell 100, to the fuel cell 100. Setting the back pressure valve 143 to the reaction-field full-close position at step S170 (described later) significantly decreases the amount of oxygen supplied to the fuel cell 100. According to this embodiment, the reaction-field full-close position of the back pressure valve 143 is set (step S200) or is updated as appropriate (step S300) as described below and is stored in the memory of the controller 200.

When it is determined at step S115 that the reaction-field full-close position has not been stored, i.e., in the case of a negative answer, the controller 200 performs a process of setting the reaction-field full-close position (step S200). The process of setting the reaction-field full-close position is performed to set the valve-opening position of the back pressure valve 143 as one control target parameter for operation control of the fuel cell 100. The negative answer that the reaction-field full-close position has not been stored may be given, for example, in the following manner. For example, during pre-shipment inspection, maintenance and inspection or operation for accident restoration, a power supply (for example, 12 V power supply, not shown) for supplying electric power to an ECU is detached for the purpose of inspection of various devices, so that the storage of the ECU is deleted. Control target parameters required for various controls of the fuel cell 100 are deleted in such power-off state. There is accordingly a need to set or reset these control target parameters. When the operator indicates deletion of the control target parameters by operation of, for example, dip switches (not shown) for the purpose of pre-shipment inspection, maintenance and inspection or operation for accident restoration, the controller 200 may read the indication and give a negative answer that the reaction-field full-close position has not been stored at step S115. In another example, the controller 200 may read data in a specified memory area and give a negative answer that the reaction-field full-close position has not been stored when the read data is zero (null).

Figure 5:
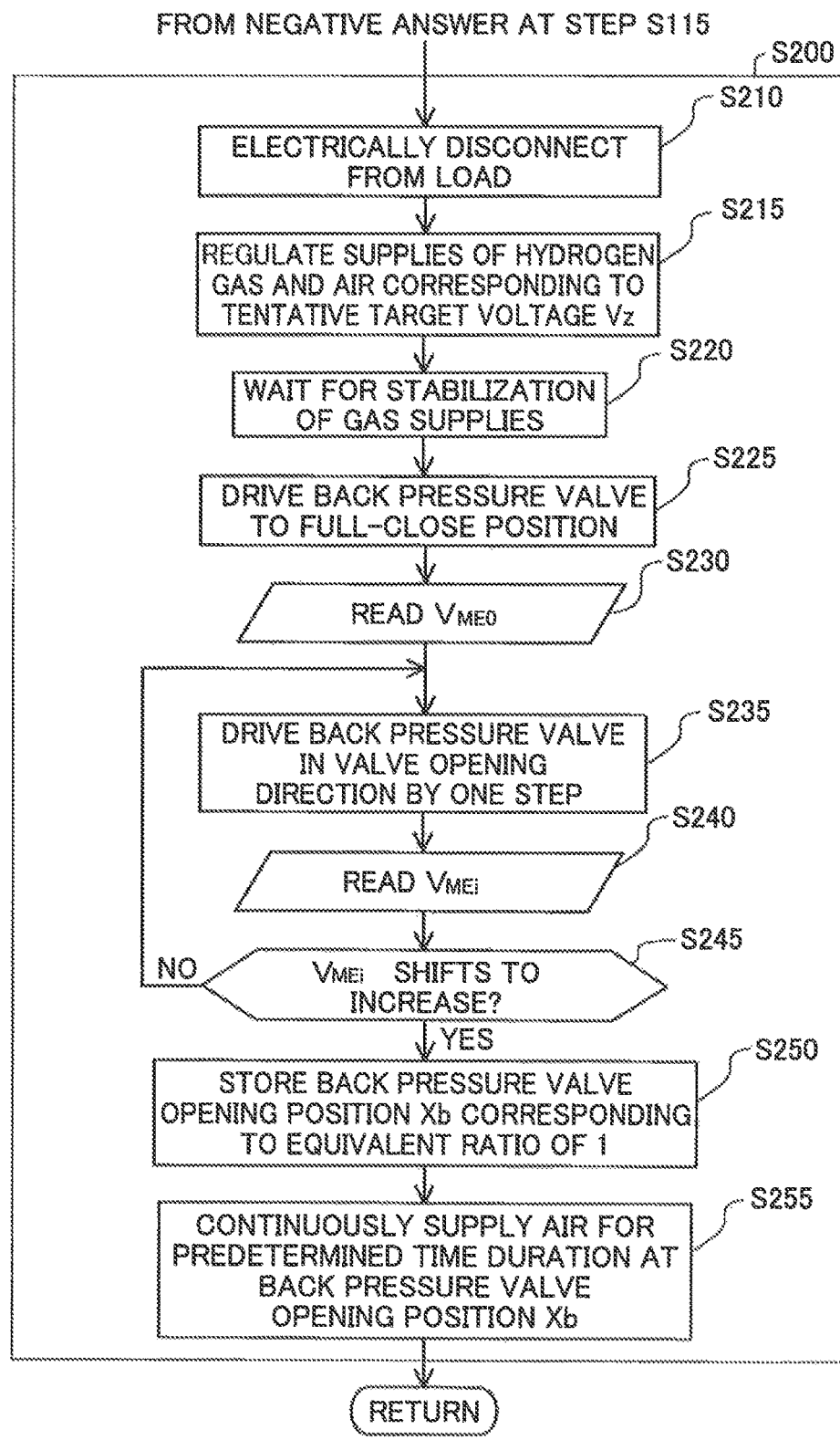
FIG. 5 is a flowchart showing a process of setting a reaction-field full-close position.

FIG. 5 is a flowchart showing the process of setting the reaction-field full-close position (step S200). In the process of setting the reaction-field full-close position, the controller 200 first controls the DC/DC converter 104 (shown in FIG. 1) to electrically disconnect the fuel cell 100 from various loads including the motor 170 and thereby sets the fuel cell 100 in the load disconnected state (step S210). The controller 200 subsequently sets a tentative target value of voltage generated in each unit cell (hereinafter referred to as tentative target voltage Vz) to about 0.8 V and regulates the supplies of the hydrogen gas and the air at flow rates corresponding to this tentative target voltage Vz (step S215) and waits for stabilization of the gas supplies (step S220). Setting the fuel cell 100 in the load disconnected state at step S210 and regulating the gas supplies at step S215 are performed in parallel simultaneously.

The controller 200 subsequently drives the back pressure valve 143 of the fuel cell 100 to the full-close position (step S225). The controller 200 stores the number of steps of the stepping motor to drive the back pressure valve 143, in the memory of the controller 200. Accordingly, at step S225, the controller 200 reversely drives the stepping motor to the full-close position by a number of steps that is identical with the number of steps by which the back pressure valve 143 is driven in the valve-opening direction from the full-close position to supply the air at the flow rate regulated at step S215. The valve-opening position of the back pressure valve 143 in this state is the design full-close position and is the mechanical full-close position at which the valve opening is mechanically equal to 0 degree. Subsequent to step S225, the controller 200 reads an open circuit voltage $V_{ME0}$ of the fuel cell 100 after fully closing the back pressure valve 143, i.e., after setting the back pressure valve 143 to the mechanical full-close position to stop supply of the air to the cathode of the fuel cell 100, from the voltage sensor 102 (shown in FIG. 1) (step S230). In the following description, the number of steps means the number of steps of the stepping motor to be driven. The voltage $V_{ME0}$ of the fuel cell 100 denotes a voltage when the back pressure valve 143 is set at the full-close position. The suffix "0" represents initial value.

The controller 200 subsequently drives the back pressure valve 143 in the valve-opening direction from the full-close position by one step (step S235) and reads a voltage $V_{MEi}$ of the fuel cell 100 after driving the back pressure valve 143 in the valve-opening direction by one step, from the to voltage sensor 102 (shown in FIG. 1) (step S240). The suffix "i" represents the number of steps driven in the valve-opening direction at step S235. After reading the voltage $V_{MEi}$ from the voltage sensor 102, the controller 200 determines whether the voltage $V_{MEi}$ after driving the back pressure valve 143 in the valve-opening direction by one step shifts to an increase (step S245). When it is determined at step S245 that the voltage $V_{MEi}$ does not shift to an increase, i.e., in the case of a negative answer, the controller 200 repeats the processing of steps S235 to S245 to drive the back pressure valve 143 in the valve-opening direction by one step, read the voltage $V_{MEi}$ from the voltage sensor 102 and determine whether the voltage $V_{MEi}$ shifts to an increase. In the load disconnected state that the fuel cell 100 is electrically disconnected from the load including the motor 170, the controller 200 gradually opens the back pressure valve 143 from the mechanical full-close position by a valve opening corresponding to one step each time (step S235) and measures the voltage $V_{MEi}$ after each gradual valve-opening operation (step S240). Since the fuel cell 100 is in the load disconnected state, the voltage $V_{MEi}$ denotes a voltage generated in each unit cell, accompanied with oxidation of hydrogen transmitted to the cathode with oxygen at the cathode.

Figure 6:
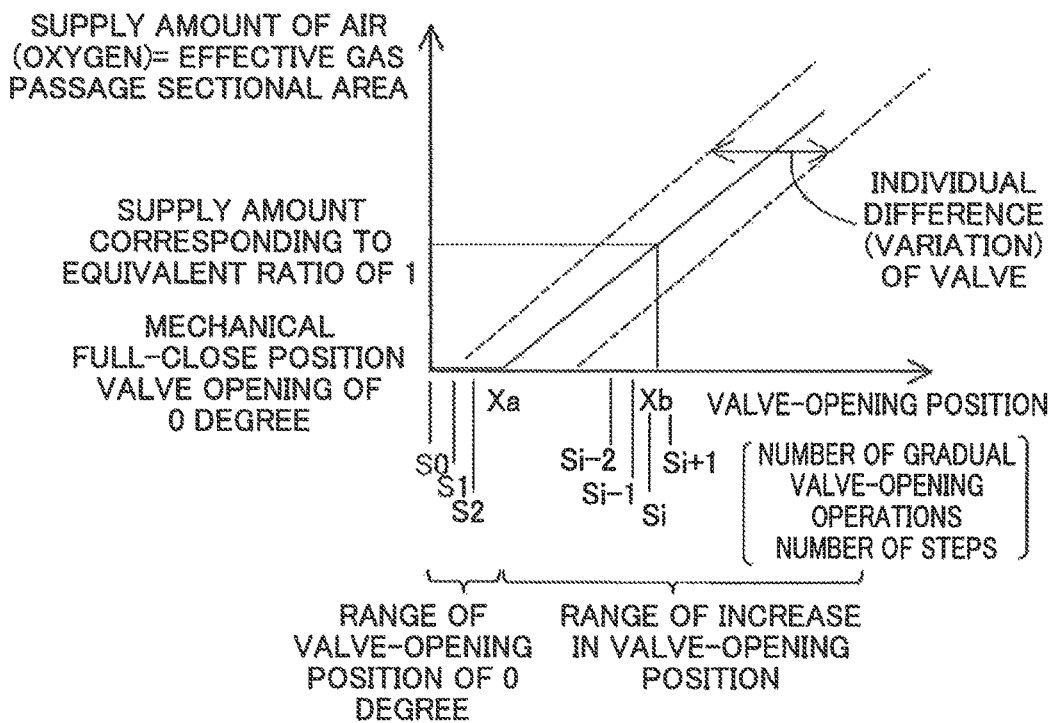
FIG. 6 is a diagram showing a variation in relationship between back pressure valve opening position Xb corresponding to the equivalent ratio of 1 and number of steps by gradual valve-opening operations with an individual variation of a back pressure valve.
Figure 7:
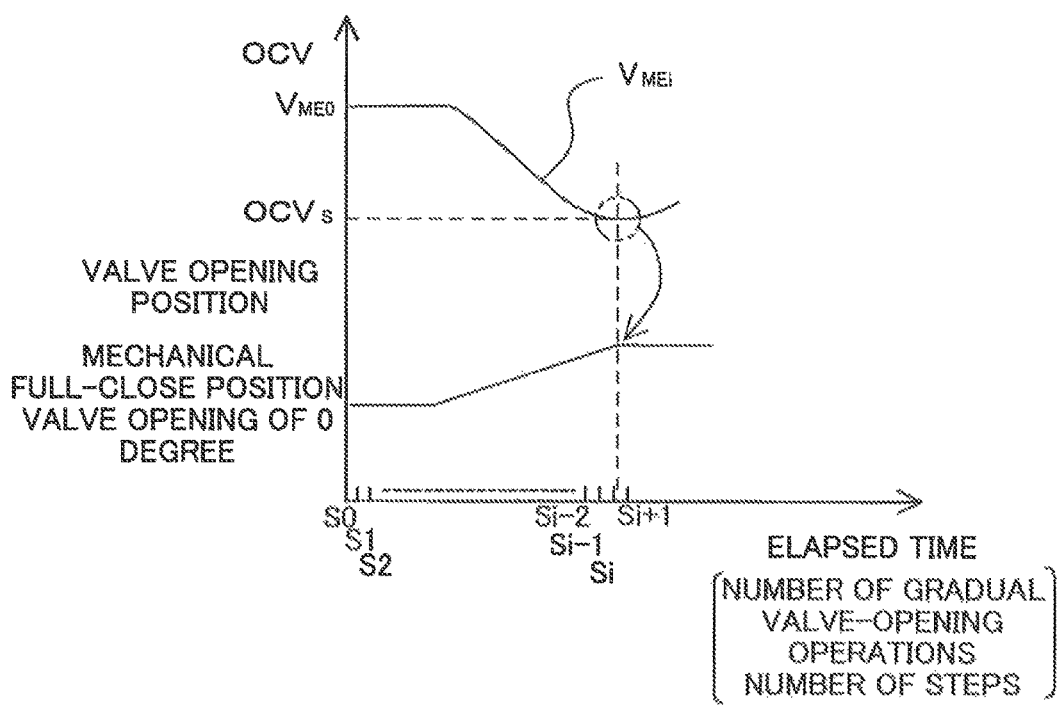
FIG. 7 is a diagram schematically illustrating a behavior of voltage $V_{MEi}$ by gradual valve-opening operations of the back pressure valve.

When it is determined at step S245 that the voltage VMEi shifts to an increase accompanied by gradually opening the back pressure valve 143 by a valve opening corresponding to one step of the stepping motor each time, i.e., in the case of an affirmative answer, the controller 200 stores either a valve-opening position corresponding to the integrated number of valve-opening steps by a gradual valve-opening operation at step S235 at the time of this affirmative answer or a valve-opening position corresponding to the integrated number of valve-opening steps by a gradual valve-opening operation at step S235 prior to this affirmative answer, as a back pressure valve opening position Xb corresponding to the equivalent ratio of 1 (step S250). The controller 200 then continuously supplies the air to the fuel cell 100 for a predetermined time duration, while keeping the valve-opening position of the back pressure valve 143 to the back pressure valve opening position Xb (step S255), and terminates this routine. In the course of supplying the air at step S255, the controller 200 also continues supplying the hydrogen gas at the flow rate regulated at step S215. The following describes a phenomenon caused by the processing of steps S235 to S250 with reference to the drawings. FIG. 6 is a diagram showing a variation in relationship between back pressure valve opening position Xb corresponding to the equivalent ratio of 1 and number of steps by gradual valve-opening operations with an individual variation of the back pressure valve 143. FIG. 7 is a diagram schematically illustrating a behavior of voltage $V_{MEi}$ by gradual valve-opening operations of the back pressure valve 143.

The following describes setting the back pressure valve 143 to the mechanical full-close position that is the design full-close position with reference to FIG. 6. Setting the valve-opening position of the back pressure valve 143 to the mechanical full-close position may be related to the number of steps of the stepping motor in the back pressure valve 143. In this case, the mechanical full-close position is included in a range of the number of steps corresponding to a "range of valve-opening position of 0 degree" shown in FIG. 6. The valve-opening position in this range converted from the number of steps of the stepping motor is lower than a specified valve-opening position Xa. Even when the back pressure valve 143 is continuously driven by gradual valve-opening operations to be gradually opened by a valve opening corresponding to one step of the stepping motor each time (step S235) from the mechanical full-close position (step S225), the supply amount of oxygen is kept zero in the "range of valve-opening position of 0 degree" as shown in FIG. 6. In this range, even when the back pressure valve 143 is driven in the valve-opening direction from the mechanical full-close position, the gas passage effective sectional area of the back pressure valve 143 is kept zero. This is attributed to that a seal member included in the back pressure valve 143 is kept compressed to provide the gas passage effective sectional area substantially equal to zero. When the number of gradual valve-opening operations (number of steps Si) is incremented to increase the valve-opening position of the back pressure valve 143 to the specified valve-opening position Xa, the compression of the seal member is released in the back pressure valve 143 to increase the gas passage effective sectional area above zero and start supplying oxygen. The specified valve-opening position Xa denotes a valve-opening position that actually starts supplying oxygen to the cathode of the fuel cell 100 and substantially differs from the mechanical full-close position. The specified valve-opening position Xa, however, differs from the mechanical full-close position by only about one step of the stepping motor and is still relatively close to the mechanical full-close position. Increasing the number of gradual valve-opening operations (number of steps Si) to make the valve-opening position of the back pressure valve 143 equal to or higher than this valve-opening position Xa results in increasing the amount of oxygen supplied to the cathode. The supply amount of oxygen is increased from the state that the back pressure valve 143 is driven to the full-close position at step S225. The increased supply amount of oxygen, however, still belongs to the oxygen deficiency area A shown in FIG. 3 and does not reach the amount of oxygen corresponding to the equivalent ratio of 1 that allows the transmitted hydrogen to be fully oxidized.

Gradual but continuous supply of oxygen to the cathode causes the OCV of the fuel cell 100 to be substantially kept at the voltage $V_{ME0}$ measured at step S230 as shown in FIG. 7. With progress of oxidation of the remaining hydrogen, however, oxygen becomes deficient and the voltage $V_{ME0}$ gradually decreases.

When the number of gradual valve-opening operations (number of steps Si) is increased to make the valve-opening position of the back pressure valve 143 equal to or higher than this valve-opening position Xa, the increased supply amount of oxygen reaches the amount of oxygen corresponding to the equivalent ratio of 1 that allows the transmitted hydrogen to be fully oxidized. The OCV of the fuel cell 100 then shifts to an increase with continuation of the gradual valve-opening operations as shown in FIG. 7. A valve-opening position Xb at the timing when the OCV shifts to an increase supplies an amount of oxygen corresponding to the equivalent ratio of 1 that allows the transmitted hydrogen to be fully oxidized and is called reaction-field full-close position. The valve-opening position Xb shown in FIGS. 6 and 7 is equivalent to the back pressure valve opening position Xb corresponding to the equivalent ratio of 1 at step S250 in the process of setting the reaction-field full-close position in FIG. 5. Each gradual valve-opening operation opens the back pressure valve 143 by a valve opening corresponding to one step. The valve-opening position Xb at the timing when the OCV shifts to an increase may be identical with a valve-opening position of the back pressure valve 143 after any number of gradual valve-opening operations, for example, after an Si-th gradual valve-opening operation or may be between a valve-opening position after an Si-th gradual valve-opening operation and a valve-opening position after an (Si+1)-th gradual valve-opening operation as schematically shown in FIG. 6. By taking into account this likelihood, the controller 200 stores either the valve-opening position corresponding to the integrated number of valve-opening steps (Si+1) which is integrated up to the timing of affirmative answer when it is determined that the OCV shifts to an increase or the valve-opening position corresponding to the integrated number of valve-opening steps (Si) by a gradual valve-opening operation prior to the affirmative answer, as the back pressure valve opening position Xb corresponding to the equivalent ratio of 1 at step S250 as described above. The stored back pressure valve opening position Xb is used for control of the back pressure valve 143 as appropriate during control in the intermittent operation mode described later. At step S250, the controller 200 stores the voltage $V_{ME0}$ that provides the back pressure valve opening position Xb, as a comparison reference open circuit voltage OCVs, in addition to the back pressure valve opening position Xb. The valve-opening position corresponding to the integrated number of valve-opening steps (Si+1) differs from the valve-opening position corresponding to the previous integrated number of valve-opening steps (Si) by only a valve opening corresponding to one step. This difference is significantly small, so that either of these valve-opening positions is stored as the back pressure valve opening position Xb. The stored back pressure valve opening position Xb corresponding to the equivalent ratio of 1 is equivalent to the "regulation reference valve-opening position" described in SUMMARY.

As the premise of determining the back pressure valve opening position Xb corresponding to the equivalent ratio of 1, the fuel cell system 30 of the embodiment drives the back pressure valve 143 to the mechanical full-close position at step S225 as described above. The back pressure valve opening position Xb that is the reaction-field full-close position may be estimated to some extent by design or by test. In this case, the back pressure valve 143 may be driven to a predetermined valve-opening position that is included in the range of valve-opening position of 0 degree in FIG. 6 and is on the valve-closing side of the estimated reaction-field full-close position, instead of the mechanical full-close position. There is, however, a possibility that the actual reaction-field full-close position is significantly different from the estimated reaction-field full-close position. By taking into account such likelihood, it is desirable to set the predetermined valve-opening position having a sufficiently large difference on the valve-closing side from the estimated reaction-field full-close position. When this is described by the number of steps of the stepping motor of the back pressure valve 143, the back pressure valve 143 is to be driven in the valve-closing direction by a number of steps that is greater than the number of steps S0 to S2 shown in FIG. 6 and corresponds to a valve-opening position having a sufficiently large difference on the valve-closing side from the estimated reaction-field full-close position.

Figure 8:
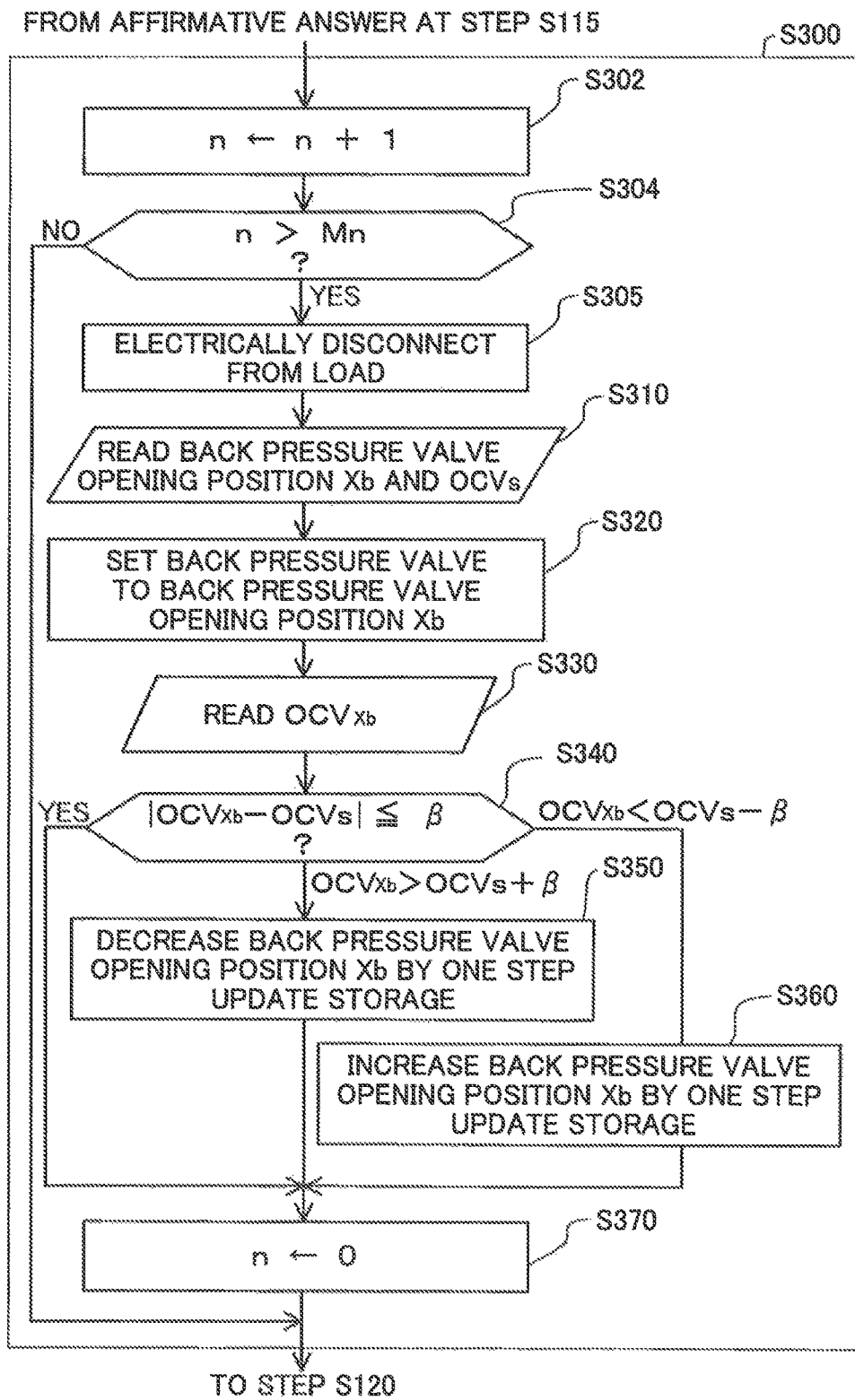
FIG. 8 is a flowchart showing a process of learning the reaction-field full-close position.

Referring back to FIG. 4, when it is determined at step S115 that the reaction-field full-close position has been stored, i.e., in the case of an affirmative answer, the controller 200 performs a process of learning the reaction-field full-close position (step S300). FIG. 8 is a flowchart showing the process of learning the reaction-field full-close position. In the process of learning the reaction-field full-close position, the controller 200 first increments a counter n for setting the learning span by value 1 (step S302) and determines whether the incremented counter n becomes greater than a learning span-specifying counter value Mn (step S304). In the case of a negative answer at step S304, the controller 200 determines that the current time is not a learning timing of the stored reactive-field full-close position and proceeds to step S120 shown in FIG. 4 without any further processing in the process of learning the reactive-field full-close position. In the case of an affirmative answer at step S304, on the other hand, in order to start learning the stored reaction-field full-close position, like step S210 in FIG. 5 described above, the controller 200 controls the DC/DC converter 104 (shown in FIG. 1) to electrically disconnect the fuel cell 100 from various loads including the motor 170 and thereby sets the fuel cell 100 in the load disconnected state (step S305). The controller 200 subsequently reads the back pressure valve opening position Xb and the comparison reference open circuit voltage OCVs that is the voltage $V_{ME0}$ providing this back pressure valve opening position Xb, which are stored at step S250 in the process of setting the reaction-field full-close position shown in FIG. 5 (step S310), and sets the valve-opening position of the back pressure valve to the read back pressure valve opening position Xb (step S320). More specifically, at step S320, the controller 200 drives the stepping motor of the back pressure valve 143 to a step corresponding to the read back pressure valve opening position Xb.

The controller 200 subsequently reads an open circuit voltage $OCV_{Xb}$ in each unit cell of the fuel cell 100 at the back pressure valve opening position Xb from the voltage sensor 102 (shown in FIG. 1) (step S330) and compares an absolute value of difference voltage between the open circuit voltage $OCV_{Xb}$ and the comparison reference open circuit voltage OCVs with a predetermined threshold voltage β (step S340). The threshold voltage β is set by taking into account a possible fluctuation in gas supply caused by a tolerance in driving condition of the back pressure valve 143 in a predetermined time period. When it is determined at step S340 that the absolute value of the difference voltage is equal to or smaller than the threshold voltage β, i.e., in the case of an affirmative answer, it is determined that the back pressure valve opening position Xb has no significant variation and that there is no need to learn the back pressure valve opening position Xb. The controller 200 accordingly proceeds to step S370 described later.

When it is determined at step S340 that the open circuit voltage $OCV_{Xb}$ is higher than the comparison reference open circuit voltage OCVs by more than the threshold voltage β, on the other hand, the controller 200 determines that the effective sectional area of the back pressure valve 143 is increased to an excessively opened position by some reason and thereby decreases the back pressure valve opening position Xb by one step and updates the storage (step S350). When it is determined at step S340 that the open circuit voltage $OCV_{Xb}$ is lower than the comparison reference open circuit voltage OCVs by more than the threshold voltage β, the controller 200 determines that the effective sectional area of the back pressure valve 143 is decreased to an excessively closed position by some reason and thereby increases the back pressure valve opening position Xb by one step and updates the storage (step S360). Accordingly the controller 200 performs either step S350 or step S360 to correct the stored back pressure valve opening position Xb such as to decrease the difference voltage between the open circuit voltage $OCV_{Xb}$ at the stored back pressure valve opening position Xb and the comparison reference open circuit voltage OCVs and update the storage by storing the corrected back pressure valve opening position Xb as new back pressure valve opening position Xb. After the processing of step S340, step S350 or step S360, the controller 200 sets the counter n to value 0 and clears the counter n (step S370) and proceeds to step S120 described below.

Subsequent to step S300, the controller 200 proceeds to step S120 shown in FIG. 4 to determine whether the current cycle of the intermittent operation control routine is a first cycle of the intermittent operation control routine performed in the fuel cell system 30 after an operation of an ignition switch (not shown). When it is determined that the current cycle is the first cycle after a change to the intermittent operation mode this time, the controller 200 sets the valve-opening position of the back pressure valve 143 to the back pressure valve opening position Xb set at step S250 (shown in FIG. 5) or the back pressure valve opening position Xb updated at step S350 or step S360 (shown in FIG. 8) and thereby controls the back pressure valve 143 to a reaction-field full-close state (step S170). The controller 200 subsequently obtains a voltage value Vme of the fuel cell 100 from the voltage sensor 102 (step S175).

The reaction-field full-close state herein means a valve-opening position of the back pressure valve 143 that supplies the amount of oxygen at a boundary between the oxygen deficiency area A and the equivalent ratio-of-approximately-1 area B shown in FIG. 3. In other words, the reaction-field full-close state denotes a valve-opening position of the back pressure valve 143 that supplies an amount of oxygen which is required for oxidation of hydrogen transmitted through the electrolyte membrane during stop of power generation of the fuel cell 100, to the fuel cell 100. Controlling the back pressure valve 143 to the reaction-field full-close state at step S170 drastically decreases the amount of oxygen supplied to the fuel cell 100. According to this embodiment, the valve-opening position of the back pressure valve 143 that provides the reaction-field full-close state is set in advance as described above or is further learned as appropriate as described above and is stored in the memory of the controller 200.

When it is determined at step S120 that the current cycle is the first cycle after a change to the intermittent operation mode this time, i.e., around the time that a change from the ordinary operation mode to the intermittent operation mode, an excess amount of oxygen is supplied to the fuel cell 100. Stopping power generation of the fuel cell 100 immediately after step S170 is thus likely to increase the OCV of the fuel cell 100 to an unacceptable level. Power generation of the fuel cell 100 may thus be continued even after step S170, for example, in the state that the output voltage of the fuel cell 100 is equal to or lower than an allowable upper limit. In the case where power generation of the fuel cell 100 is continued after step S170, the amount of oxygen in the cathode-side flow path of the fuel cell 100 is consumed by power generation and drastically decreases. This leads to a gradual decrease in output current of the fuel cell 100. When the output current of the fuel cell 100 decreases to a certain level, the diode included in the DC/DC converter 104 works to shut off the power supply from the fuel cell 100 to the load and thereby stop power generation of the fuel cell 100.

In the case where power generation of the fuel cell 100 is stopped after step S170, on the other hand, the amount of oxygen in the cathode-side flow path in the fuel cell 100 is rapidly decreased by oxidation of hydrogen transmitted through the electrolyte membrane on the cathode. Decreasing the amount of oxygen in the fuel cell 100 causes the OCV of the fuel cell 100 after stop of power generation to be decreased and approach the allowable upper limit. Further continuation of stop of power generation of the fuel cell 100 causes the OCV of the fuel cell 100 to be decreased to or below this allowable upper limit.

At step S175, the controller 200 obtains the output voltage of the fuel cell 100 during power generation of the fuel cell 100, while obtaining the OCV of the fuel cell 100 during stop of power generation of the fuel cell 100. According to this embodiment, the voltage value Vme denotes an average cell voltage calculated by dividing the voltage value of the entire cell stack detected by the voltage sensor 102 by the number of cells included in the cell stack.

After obtaining the voltage value Vme of the fuel cell 100 at step S175, the controller 200 compares the obtained voltage value Vme with a target voltage Vmark +α (step S180). The target voltage Vmark is stored in advance in the memory of the controller 200 as described above, and α denotes a positive value provided to suppress the OCV of the fuel cell 100 from decreasing to below the target voltage Vmark due to a delay in increase of the supply amount of oxygen to the cathode-side flow path. As described above, the voltage value Vme gradually decreases after stop of power generation of the fuel cell 100. According to this embodiment, the controller 200 repeats the input of the voltage value Vme at step S175 and the determination at step S180 until the voltage value Vme becomes equal to or lower than the target voltage Vmark +α.

When it is determined at step S180 that the voltage value Vme becomes equal to or lower than the target voltage Vmark +α, the controller 200 outputs a driving signal to the stepping motor of the back pressure valve 143 in order to control the valve-opening position of the back pressure valve 143 to a valve-opening position stored in advance to achieve the target voltage Vmark (step S190) and terminates this routine. This increases the amount of oxygen supplied to the fuel cell 100 from the amount of oxygen corresponding to the reaction-field full-close state to the amount of oxygen corresponding to the valve-opening position of the back pressure valve 143 that achieves the target voltage Vmark.

When the supply amount of oxygen is increased after a drop of the voltage value Vme to the target voltage Vmark, the voltage of the fuel cell 100 is likely to further decrease to below the target voltage Vmark until a desired amount of oxygen reaches the cathode. According to this embodiment, the supply amount of oxygen is increased at the timing when the voltage value Vme that is the average cell voltage becomes equal to or lower than the target voltage Vmark +α. This suppresses the voltage of the fuel cell 100 from decreasing to below the target voltage Vmark. The value a may be set adequately by taking into account the response of driving the to back pressure valve 143 and the time duration when oxygen actually reaches the cathode after an increase in supply amount. The time duration when oxygen actually reaches the cathode may be affected by, for example, the flow path resistance and the flow path length of the cathode-side flow path.

When it is determined at step S120 the current cycle is not the first cycle after a change to the intermittent operation mode this time, i.e., when it is determined that control of the valve-opening position of the back pressure valve 143 has already been started, the controller 200 obtains the voltage value Vme of the fuel cell 100 from the voltage sensor 102 (step S130). Since power generation of the fuel cell 100 has already been stopped, the controller 200 obtains the open circuit voltage OCV of the fuel cell 100 as the voltage value Vme at step S130.

After obtaining the voltage value Vme at step S130, the controller 200 compares the obtained voltage value Vme with the target voltage Vmark (step S150). When the result of comparison shows that the obtained voltage value Vme is higher than the target voltage Vmark by at least a first value and indicates a voltage increasing state, the controller 200 decreases the valve opening position of the back pressure valve 143 in the non-power generation state to decrease the flow rate of oxygen supplied to the cathode-side flow path (step S160) and then terminates this routine. When the result of comparison at step S150 shows that the obtained voltage value Vme is lower than the target voltage Vmark by at least a second value and indicates a voltage decreasing state, the controller 200 increases the valve opening position of the back pressure valve 143 in the non-power generation state to increase the flow rate of oxygen supplied to the cathode-side flow path (step S162) and then terminates this routine. When the result of comparison at step S150 indicates neither the voltage increasing state nor the voltage decreasing state but indicates a voltage maintaining state, the controller 200 maintains the current valve opening position of the back pressure valve 143 in the non-power generation state to keep the amount of oxygen supplied to the cathode-side flow path (step S164) and then terminates this routine.

According to this embodiment, in the case of decreasing the valve-opening position of the back pressure valve 143 at step S160 or in the case of increasing the valve-opening position of the back pressure valve 143 at step S162, the driving amount of the stepping motor of the back pressure valve 143 is varied to change the valve-opening position by one step. In other words, the valve-opening position of the back pressure valve 143 is changed by the minimum unit of changing the valve-opening position. This suppresses a drastic voltage variation of the fuel cell 100. The amount of each change in valve-opening position of the back pressure valve 143 may, however, be set to two or more steps.

The first value used for the determination to decrease the amount of oxygen at step S160 may be different from or may be identical with the second value used for the determination to increase the amount of oxygen at step S162. The first value and the second value may be set arbitrarily to positive values by taking into account, for example, the response of changing the flow rate of oxygen to the driving signal input to the back pressure valve 143.

D. Effects

As described above, during operation of the fuel cell 100 in the load disconnected state that the fuel cell 100 is electrically disconnected from the load such as the motor 170, the fuel cell system 30 of the embodiment sets the back pressure valve 143 to the full-close position to stop the supply of the air (supply of oxygen) to the cathode and subsequently performs the gradual valve-opening operation to open the back pressure valve 143 by one step each time (step S235). As shown in FIG. 7, when the open circuit voltage $V_{MEi}$ of the fuel cell 100 measured after each gradual valve-opening operation shifts to an increase during continuation of gradual valve-opening operations, the fuel cell system 30 of the embodiment stores either the valve-opening position corresponding to the integrated number of valve-opening steps (Si+1) by a gradual valve-opening operation at the timing of determination that the voltage $V_{MEi}$ shifts to an increase or the valve-opening position corresponding to the integrated number of valve-opening steps (Si) by a gradual valve-opening operation prior to this determination, as the back pressure valve opening position Xb corresponding to the equivalent ratio of 1 (step S250). This back pressure valve opening position Xb supplies a just enough amount of oxygen corresponding to the equivalent ratio of 1 that allows hydrogen transmitted from the anode to the cathode to be oxidized.

The fuel cell system 30 of the embodiment regulates the back pressure valve opening position Xb corresponding to the equivalent ratio of 1 to make the open circuit voltage OCV during operation of the fuel cell 100 in the non-power generation state equal to the target voltage Vmark, so as to regulate the amount of oxygen supplied to the fuel cell 100. In the state that the flow rate of oxygen supplied to the cathode is regulated by controlling the back pressure valve 143 to the back pressure valve opening position Xb, a small amount of oxygen remains at the anode or is supplied to the anode in the non-power generation state of the fuel cell 100, so that the air is supplied to the cathode at a low flow rate that introduces oxygen at an equivalent ratio of 1 to the transmitted hydrogen to the cathode. The fuel cell system 30 of the embodiment controls the back pressure valve 143 to the stored back pressure valve opening position Xb corresponding to the equivalent ratio of 1 by using the target voltage Vmark and thereby allows for fine adjustment of the flow rate of the oxidizing gas taking advantage of the behavior of the measured voltage of the fuel cell 100.

The fuel cell system 30 of the embodiment gradually opens the back pressure valve 143 by each step of the stepping motor (step S235) in the process of setting the back pressure valve opening position Xb corresponding to the equivalent ratio of 1. The fuel cell system 30 of the embodiment suppresses the open circuit voltage $V_{MEi}$ of the fuel cell 100 from decreasing to a low voltage such as 0 volt in the course of gradually opening the back pressure valve 143 so as to cause the open circuit voltage $V_{MEi}$ of the fuel cell 100 to shift to an increase during continuation of gradual valve-opening operations, thus suppressing deterioration of the catalyst in the fuel cell 100. The back pressure valve 143 may be gradually opened by two steps or by three steps each time. The gradual valve-opening operations by a plurality of steps each time suppresses an excessive decrease in open circuit voltage $V_{MEi}$ of the fuel cell 100. In the case of gradually opening the back pressure valve 143 by a plurality of steps each time, the valve-opening speed may be simultaneously regulated, in order to more effectively suppress an excessive decrease in open circuit voltage $V_{MEi}$ of the fuel cell 100.

The fuel cell system 30 of the embodiment controls the back pressure valve 143 to maintain the back pressure valve opening position Xb corresponding to the equivalent ratio of 1 for a predetermined time duration (step S255). The fuel cell system 30 of the embodiment accordingly suppresses elution and reduction of the cathode catalyst in the load disconnected state that the fuel cell 100 is electrically disconnected from the load such as the motor 170 and improves the stability of the catalyst, thus allowing subsequent power generating operation of the fuel cell 100 to be performed without difficulty.

The fuel cell system 30 of the embodiment gradually opens the back pressure valve 143 by one step each time in the process of setting the back pressure valve opening position Xb corresponding to the equivalent ratio of 1. The interval of the gradual valve-opening operations by one step is set to a time period that allows a voltage change accompanied with oxidation of transmitted hydrogen to be detected by the voltage sensor 102. The fuel cell system 30 of the embodiment accordingly prevents a subsequent gradual valve-opening operation of the back pressure valve 143 from being performed prior to measurement of a voltage change accompanied with a gradual valve-opening operation by the voltage sensor 120. The fuel cell system 30 of the embodiment thus accurately obtains the behavior of the open circuit voltage $V_{MEi}$ of the fuel cell 100 and enhances the accuracy of controlling the back pressure valve opening position Xb.

The fuel cell system 30 of the embodiment sets the back pressure valve opening position Xb corresponding to the equivalent ratio of 1 for the purpose of, for example, maintenance and inspection and learns and updates the back pressure valve opening position Xb during a run of the vehicle in the intermittent operation control. This provides the following advantages. Each mechanical component such as the back pressure valve 143 generally has an allowable individual difference in functions and is subjected to aged deterioration of the functions. With regard to the back pressure valve 143, as shown in FIG. 6, the valve opening position Xa that is the mechanical full-close position and the back pressure valve opening position Xb corresponding to the equivalent ratio of 1 have individually differences in the illustrated ranges. One back pressure valve 143 is also likely to have a variation in the illustrated range by the aged deterioration. The fuel cell system 30 of the embodiment sets the back pressure valve opening position Xb corresponding to the equivalent ratio of 1 for the purpose of, for example, maintenance and inspection and learns and updates the back pressure valve opening position Xb during a run of the vehicle in the intermittent operation control (step S300). This allows for drive control of the back pressure valve 143 by taking into account the variation in control based on the individual difference and the effect of the aged deterioration.

The fuel cell system 30 of the embodiment learns and corrects the back pressure valve opening position Xb (steps S350 to S360 in FIG. 8) in the intermittent operation control of FIG. 4. This learning and correction of the back pressure valve opening position Xb by driving the back pressure valve 143 is performed at the timing when the incremented counter n reaches the learning span-specifying counter value Mn. This adequately controls the frequency of driving the back pressure valve 143 to the back pressure valve opening position Xb in the intermittent operation mode.

The fuel cell system 30 of the embodiment can avoid the high potential state of the fuel cell 100 without power generation of the fuel cell 100 in a low load state that the load request is equal to or lower than the predefined reference value. There is accordingly no need to start unrequired, excessive power generation for only the purpose of avoiding the high potential state. This also suppresses the energy efficiency of the fuel cell system 30 from being decreased due to, for example, storage of the generated electric power into the secondary battery 172.

As understood from the IV characteristic shown in FIG. 2, an available method of preventing the fuel cell 100 from having a high open circuit voltage OCV by stopping power generation of the fuel cell 100 may perform low-output power generation of the fuel cell 100 to provide a low output current I1 such as to control the output voltage of the fuel cell 100 to an allowable level of high voltage V1. The secondary battery 172 may be charged with excessive electric power thus generated. The configuration that electric power generated by the fuel cell 100 is once charged into the secondary battery 172 and is then output from the secondary battery 172 to the load has a lower energy efficiency than the configuration that electric power is directly supplied from the fuel cell 100 to the load. The secondary battery 172 has the limited capacity, so that incasing the amount of power generation to avoid the high potential state is likely to cause a failure in continuing the low-output power generation for the purpose of avoiding the high potential state or a failure in recovering the regenerative electric power during braking of the vehicle. This may lead to a difficulty in adequately maintaining the energy balance in the fuel cell system. The fuel cell system 30 of the embodiment can avoid the high potential state with stopping power generation of the fuel cell 100 in the predetermined low load state and thereby avoids the potential problems described above.

The fuel cell system 30 of the embodiment regulates the valve-opening position of the back pressure valve 143 based on the current open circuit voltage OCV of the fuel cell 100, so as to vary the amount of oxygen that is supplied to the cathode-side flow path and is required to maintain the voltage. An available method of regulating the amount of the air or the amount of oxygen supplied to the fuel cell 100 may directly detect the supply amount of oxygen and change the supply amount of oxygen to a desired value. This method, however, requires a flowmeter to detect the amount of oxygen supplied to the cathode-side flow path, for example, an air flowmeter to detect the supply amount of the air. The fuel cell system 30 of the embodiment, however, does not require the flowmeter and thus simplifies the system configuration.

The fuel cell system 30 of the embodiment branches off the flow path of the air supplied to the cathode-side flow path and controls the supply amount of oxygen by regulating the valve-opening position of the back pressure valve 143. This enables the supply amount of oxygen to be controlled with high accuracy. An available method of varying the supply amount of oxygen may vary the driving amount of the compressor 130. In this case, a compressor having a wide flow range to satisfy a wide range of load request from a minimum load request to a maximum load request may be employed for the compressor 130. An additional compressor for the low flow rate may be separately provided to regulate the flow rate of oxygen. The fuel cell system 30 of the embodiment allows for fine adjustment of the air flow rate with the high accuracy without separately providing the additional compressor. A different method, for example, the method of separately providing an additional compressor for the low flow rate, may be applied to regulate the supply amount of oxygen and control the voltage value Vme to approach the target voltage Vmark. Another method may perform the control described above with varying the distribution ratio of the air by the distribution valve 144. This configuration also achieves the advantageous effect of avoiding the high potential state with stopping power generation, like the embodiment described above.

E. Modifications

The invention is not limited to the embodiment described above but may be implemented by a diversity of other aspects and configurations without departing from the scope of the invention. For example, the technical features of the embodiment corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

The fuel cell system 30 of the embodiment regulates the back pressure by driving the back pressure valve 143 in the valve-closing direction and in the valve-opening direction, so as to regulate the flow rate of the air supplied to the cathode of the fuel cell 100. This configuration is, however, not restrictive. For example, the distribution ratio of the distribution valve 144 may be regulated, in combination with regulation of the back pressure valve 143. In another example, a throttle valve may be provided as a flow regulating valve in the second air flow path 145 that is the inlet flow path to the fuel cell 100 or throttle valves may be provided both at an inlet and an outlet of the fuel cell 100. Providing a flow regulating valve to regulate the amount of oxygen supplied to the cathode achieves the advantageous effect similar to that of the embodiment described above.

The fuel cell system 30 of the embodiment stores either the valve-opening position corresponding to the integrated number of valve-opening steps (Si+1) at the timing of determination that the voltage $V_{MEi}$ of the fuel cell 100 shifts to an increase during continuation of gradual valve-opening operations or the valve-opening position corresponding to the integrated number of valve-opening steps (Si) prior to this determination, as the back pressure valve opening position Xb corresponding to the equivalent ratio of 1. This configuration is, however, not restrictive. For example, a valve-opening position corresponding to an integrated number of valve-opening steps (Si+2) immediately after the integrated number of valve-opening steps (Si+1) by a gradual valve-opening operation at the timing of determination that the voltage $V_{MEi}$ of the fuel cell 100 shifts to an increase may be stored as the back pressure valve opening position Xb corresponding to the equivalent ratio of 1. Among valve-opening positions of the back pressure valve 143 by gradual valve-opening operations at a predetermined number of timings including and before and after the timing when it is determined that the voltage $V_{MEi}$ of the fuel cell 100 shifts to an increase during continuation of gradual valve-opening operations, any valve-opening position of the back pressure valve 143 by a gradual valve-opening operation at any timing may be stored as the back pressure valve opening position Xb, as long as a difference from the valve-opening position of the back pressure valve 143 at the timing of determination that the voltage $V_{MEi}$ of the fuel cell 100 shifts to an increase during continuation of gradual valve-opening operations is within a predetermined range.

The fuel cell system 30 of the embodiment drives the back pressure valve 143 to the full-close position in the process of setting the back pressure valve opening position Xb corresponding to the equivalent ratio of 1. This configuration is, however, not restrictive. According to a modification, the back pressure valve 143 may be driven in the valve-closing direction to a specified valve position before the full-close position and subsequently perform gradual valve-opening operations, as along as a shift of the OCV to an increase is detectable during continuation of gradual valve-opening operations.

The fuel cal system 30 of the embodiment gradually opens the back pressure valve 143 in the process of setting the back pressure valve opening position Xb corresponding to the equivalent ratio of 1. This configuration is, however, not restrictive. According to a modification, the back pressure valve 143 may be driven in the valve-opening position to the full-open position and subsequently perform gradual valve-closing operations by one step each time. In the configuration of performing the gradual valve-closing operations, a valve-opening position corresponding to an integrated number of valve-closing steps of the stepping motor at the timing when it is determined that the open circuit voltage $V_{MEi}$ of the fuel cell 100 shifts to a decrease during continuation of valve-closing operations or an integrated number of valve-closing steps immediately before or immediately after the determination may be stored as the back pressure valve opening position Xb corresponding to the equivalent ratio of 1. In this modification, any valve-opening position of the back pressure valve 143 by a gradual valve-closing operation at any timing may be stored as the back pressure valve opening position Xb, as long as a difference from the valve-opening position of the back pressure valve 143 at the timing of determination that the voltage $V_{MEi}$ of the fuel cell 100 shifts to a decrease during continuation of gradual valve-closing operations is within a predetermined range.

The fuel cell system 30 of the embodiment sets the back pressure valve opening position Xb (step S200 in FIG. 5) upon satisfaction of the condition of the load request (affirmative answer at step S110) in the intermittent operation control of FIG. 4. This configuration is, however, not restrictive. According to a modification, when only a short time has elapsed since learning and correction of the back pressure valve opening position Xb in the intermittent operation control of FIG. 4, the back pressure valve opening position Xb may not be reset even upon satisfaction of the condition of the load request. The seal member of the back pressure valve 143 is unlikely to be cured or deteriorated with time in such a short elapsed time, so that the back pressure valve opening position Xb is unlikely to have a significant variation. Omitting the process of resetting the valve-opening position in such cases desirably reduces the load of operations of the controller 200.

The fuel cell system 30 of the embodiment learns and updates the back pressure valve opening position Xb by the series of processing at step S300, when the condition of the load request is satisfied (affirmative answer at step S110) and the reaction-field full-close position has been stored in the intermittent operation control of FIG. 4. This configuration is, however, not restrictive. According to a modification, the back pressure valve 143 may be gradually opened or gradually closed according to the result of comparison between the voltage value Vme and the target voltage Vmark at step S150 in the intermittent operation control of FIG. 4. The modification may detect a variation in voltage value Vme after each gradual valve-opening operation or gradual valve-closing operation at step S150 and may learn and update the back pressure valve opening position Xb at subsequent step S160 or step S162.

What is claimed is:

1. A control method of a flow regulating valve of an oxidizing gas, the flow regulating valve being configured to regulate a flow rate of the oxidizing gas supplied to a cathode of a fuel cell, the control method of the flow regulating valve of the oxidizing gas comprising:
   a first process of continuously performing either a valve-opening operation that opens the flow regulating valve by a predetermined valve opening from a full-close position or a valve-closing operation that closes the flow regulating valve by a predetermined valve opening from a full-open position in a load disconnected state that the fuel cell is electrically disconnected from a load which receives supply of electric power from the fuel cell, so as to gradually change a supply amount of the oxidizing gas that is introduced to the cathode and cause hydrogen transmitted from an anode across an electrolyte membrane to the cathode of the fuel cell to be oxidized with oxygen included in the introduced oxidizing gas;
   a second process of measuring an open circuit voltage of the fuel cell accompanied with oxidation of the hydrogen after each valve-opening operation or each valve-closing operation; and
   a third process of storing either at least one valve-opening position among valve-opening positions of the flow regulating valve by the valve-opening operation in the first process at a predetermined number of timings including a timing when the measured voltage shifts to an increase during continuation of the valve-opening operation or at least one valve-opening position among valve-opening positions of the flow regulating valve by the valve-closing operation in the first process at predetermined number of timings including a timing when the measured voltage shifts to a decrease during continuation of the valve-closing operation, as a regulation reference valve-opening position.

2. The control method of the flow regulating valve of the oxidizing gas according to claim 1,
   wherein the first process regulates either a valve-opening amount of the flow regulating valve of during the valve-opening operation or a valve-opening interval, such as to prevent the measured voltage from decreasing to a predetermined low voltage.

3. The control method of the flow regulating valve of the oxidizing gas according to claim 2,
   wherein the third process controls the flow regulating valve, such that the valve-opening position of the flow regulating valve stored as the regulation reference valve opening position is maintained over a predetermined time duration.

4. The control method of the flow regulating valve of the oxidizing gas according to claim 1, further comprising
   a fourth process of updating and storing the regulation reference valve-opening position stored in the third process, wherein
   the third process stores an open circuit voltage of the fuel cell accompanied with oxidation of the hydrogen at the stored regulation reference valve-opening position as a comparison reference open circuit voltage, together with the regulation reference valve-opening position, and
   the fourth process comprises
      a comparison process of setting a valve-opening position of the flow regulating valve to the regulation reference valve-opening position stored in the third process in the load disconnected state of the fuel cell, measuring an open circuit voltage of the fuel cell accompanied with oxidation of the hydrogen as a comparative open circuit voltage, and comparing the comparative open circuit voltage with the comparison reference open circuit voltage; and
      a correction process of correcting the stored regulation reference valve-opening position to decrease a difference voltage between the comparative open circuit voltage and the comparison reference open circuit voltage obtained as a result of the comparison in the comparison process, and updating and storing the corrected regulation reference valve-opening position as a new regulation reference valve-opening position.

5. A flow regulation device, comprising
   a flow regulating valve that is configured to regulate a flow rate of an oxidizing gas supplied to a cathode of a fuel cell;
   a disconnector that is configured to electrically disconnect the fuel cell from a load which receives supply of electric power from the fuel cell and thereby set the fuel cell in a load disconnected state;
   a voltage meter that is configured to measure an open circuit voltage of the fuel cell; and
   a valve controller that controls opening and closing of the flow regulating valve in the load disconnected state, wherein
   the valve controller comprises
      a first controller that is configured to continuously perform either a valve-opening operation that opens the flow regulating valve by a predetermined valve opening from a full-close position or a valve-closing operation that closes the flow regulating valve by a predetermined valve opening from a full-open position, so as to change a supply amount of the oxidizing gas that is introduced to the cathode and cause hydrogen transmitted from an anode across an electrolyte membrane to the cathode of the fuel cell to be oxidized with oxygen included in the introduced oxidizing gas;
      a second controller that is configured to obtain the measured open circuit voltage of the fuel cell accompanied with oxidation of the hydrogen from the voltage meter after each valve-opening operation or each valve-closing operation; and
      a third controller that is configured to store either at least one valve-opening position among valve-opening positions of the flow regulating valve by the valve-opening operation performed by the first controller at a predetermined number of timings including a timing when the measured voltage shifts to an increase during continuation of the valve-opening operation or at least one valve-opening position among valve-opening positions of the flow regulating valve by the valve-closing operation performed by the first controller at predetermined number of timings including a timing when the measured voltage shifts to a decrease during continuation of the valve-closing operation, as a regulation reference valve-opening position.

6. The flow regulation device according to claim 5,
   wherein the first controller regulates either a valve-opening amount of the flow regulating valve during the valve-opening operation or a valve-opening interval, such as to prevent the measured voltage from decreasing to a predetermined low voltage.

7. The flow regulation device according to claim 6, wherein the third controller controls the flow regulating valve, such that the valve-opening position of the flow regulating valve stored as the regulation reference valve opening position is maintained over a predetermined time duration.

8. The flow regulation device according to claim 5 further comprises a fourth controller that is configured to update and store the regulation reference valve-opening position stored by the third controller, wherein
the third controller stores an open circuit voltage of the fuel cell accompanied with oxidation of the hydrogen at the stored regulation reference valve-opening position as a comparison reference open circuit voltage, together with the regulation reference valve-opening position, and
the fourth controller comprises
a comparator that is configured to set a valve-opening position of the flow regulating valve to the regulation reference valve-opening position stored by the third controller in the load disconnected state of the fuel cell, measure an open circuit voltage of the fuel cell accompanied with oxidation of the hydrogen as a comparative open circuit voltage, and compare the comparative open circuit voltage with the comparison reference open circuit voltage; and
a corrector that is configured to correct the stored regulation reference valve-opening position to decrease a difference voltage between the comparative open circuit voltage and the comparison reference open circuit voltage obtained as a result of the comparison by the comparator, and to update and store the corrected regulation reference valve-opening position as a new regulation reference valve-opening position.

* * * * *